US012364378B2

(12) United States Patent
Jang et al.

(10) Patent No.: US 12,364,378 B2
(45) Date of Patent: Jul. 22, 2025

(54) MOVING ROBOT AND METHOD OF CALCULATING MOVING DISTANCE OF THE SAME

(71) Applicant: LG ELECTRONICS INC., Seoul (KR)

(72) Inventors: Jaewon Jang, Seoul (KR); Seunglok Ham, Seoul (KR); Youngbin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 16/943,165

(22) Filed: Jul. 30, 2020

(65) Prior Publication Data
US 2021/0030235 A1  Feb. 4, 2021

(30) Foreign Application Priority Data

Jul. 31, 2019  (KR) .................. 10-2019-0093487
Dec. 27, 2019  (KR) .................. 10-2019-0176630

(51) Int. Cl.
*A47L 11/293* (2006.01)
*A47L 11/40* (2006.01)
*B25J 11/00* (2006.01)

(52) U.S. Cl.
CPC ......... *A47L 11/293* (2013.01); *A47L 11/4008* (2013.01); *A47L 11/4016* (2013.01);
(Continued)

(58) Field of Classification Search
CPC .............. A47L 2201/04; A47L 11/283; A47L 11/16–11/161; A47L 11/2025;
(Continued)

(56) References Cited

U.S. PATENT DOCUMENTS

2006/0185690 A1* 8/2006 Song .................. A47L 11/4083
134/21
2012/0013907 A1* 1/2012 Jung ..................... A47L 9/28
356/438
(Continued)

FOREIGN PATENT DOCUMENTS

CN  1381340 A  11/2002
CN  1493246 A  5/2004
(Continued)

OTHER PUBLICATIONS

Translation of WO2018012923 (Year: 2022).*
(Continued)

Primary Examiner — Edward F Landrum
Assistant Examiner — Sarah Akyaa Fordjour
(74) Attorney, Agent, or Firm — Birch, Stewart, Kolasch & Birch, LLP

(57) ABSTRACT

A mobile robot includes a spin mop, an encoder configured to obtain data from the spin mop and transmit the data to a controller, a sensing module configured to obtain data related to a moving distance or a moving speed, and a controller configured to calculate a moving distance or a rotation angle of the robot based on the encoder data and correct the calculated data using data obtained by the sensing module.

16 Claims, 14 Drawing Sheets

(52) U.S. Cl.
CPC ....... *A47L 11/4038* (2013.01); *A47L 11/4041* (2013.01); *A47L 11/4061* (2013.01); *A47L 11/4072* (2013.01); *A47L 11/4083* (2013.01); *A47L 2201/04* (2013.01); *B25J 11/0085* (2013.01)

(58) Field of Classification Search
CPC .... A47L 11/206; A47L 11/293; A47L 11/305; A47L 11/4038
See application file for complete search history.

(56) References Cited

U.S. PATENT DOCUMENTS

| | | | |
|---|---|---|---|
| 2013/0030750 | A1 | 1/2013 | Kim et al. |
| 2015/0142169 | A1* | 5/2015 | Kim ...................... A47L 11/282 15/98 |
| 2016/0166127 | A1* | 6/2016 | Lewis ................... A47L 9/0472 15/49.1 |
| 2017/0325647 | A1* | 11/2017 | Kwak ..................... A47L 9/009 |
| 2019/0033869 | A1 | 1/2019 | Herron et al. |
| 2019/0038105 | A1 | 2/2019 | Park et al. |
| 2019/0223677 | A1 | 7/2019 | Yoon et al. |
| 2021/0290010 | A1* | 9/2021 | Niu ..................... A47L 11/4011 |

FOREIGN PATENT DOCUMENTS

| | | |
|---|---|---|
| CN | 1514322 A | 7/2004 |
| CN | 1759797 A | 4/2006 |
| CN | 101926631 A | 12/2010 |
| CN | 102666032 A | 9/2012 |
| CN | 105072966 A | 11/2015 |
| CN | 105792720 A | 7/2016 |
| CN | 106200316 A | 12/2016 |
| CN | 106537186 A | 3/2017 |
| CN | 109688884 A | 4/2019 |
| JP | 2005-230032 A | 9/2005 |
| KR | 10-2004-0039093 | 5/2004 |
| KR | 10-2008-0094618 A | 10/2008 |
| KR | 10-1079897 B1 | 11/2011 |
| KR | 10-2012-0059427 | 6/2012 |
| KR | 10-2018-0008250 | 1/2018 |
| KR | 10-2019-0015932 | 2/2019 |
| TW | 201907852 A | 3/2019 |
| WO | WO-2018012923 A1 * | 3/2018 .............. A47L 11/14 |
| WO | WO-2019031810 A1 * | 2/2019 .............. A47L 11/16 |

OTHER PUBLICATIONS

Translation of WO2019031810A1 (Year: 2023).*
Office Action in Taiwanese Application No. 109125647 dated Nov. 15, 2021 (4 pages).
European Search Report for European Patent Application No. 20188604.1, dated Dec. 4, 2020 (6 pages).
PCT Search Report for PCT International Patent Application No. PCT/KR2020/001347, dated May 27, 2020 (5 pages).

* cited by examiner

1

MOVING ROBOT AND METHOD OF CALCULATING MOVING DISTANCE OF THE SAME

BACKGROUND

1. Field

The following description relates to a mobile robot and a method of calculating a moving distance of the mobile robot, and more particularly to a mobile robot and a method of calculating a moving distance or a rotation angle thereof.

2. Description

Robots have been developed for industrial use and have been part of factory automation. Recently, the application filed of robots has been expanded, such that medical robots, aerospace robots, and the like have been developed and household robots that can be used in ordinary homes have also been manufactured. Among these robots, a robot that can travel by itself is called a mobile robot.

A typical example of the mobile robot used in home is a robot cleaner. The robot cleaner is a home appliance which cleans a certain area by sucking dust or foreign materials from the floor while moving autonomously in the area.

A method of detecting a position of a robot cleaner are disclosed in related art 1 and related art 2, in which by using a unit which includes an upward camera and detects an absolute position, and a unit which includes a lower image sensor and detects a relative position, the absolute position may be corrected based on the relative position, thereby reducing a position error due to slipping, and accurately detecting the position of the robot cleaner. However, there is a problem in that the image sensor consumes much power compared to other sensors, and has enormous amounts of data, making it difficult to process the data.

Furthermore, in the general robot cleaner, the robot cleaner moves only by a frictional force of the spin mop, and the level of water stored in a water tank is variable, such that it is impossible to perform mopping effectively, and a problem occurs in a driving force.

Particularly, a general wet-type robot cleaner has a drawback in that it is very difficult to adjust a traveling direction using a frictional force of a rotating cloth, such that the robot cleaner performs cleaning only through random traveling, without pattern traveling which is required for thorough cleaning.

In addition, the general robot cleaner also has a drawback in that when the robot cleaner moves only through random traveling, the robot cleaner may not perform thorough cleaning in an area which is adjacent to the corner of the floor surface or the wall.

SUMMARY

In the case of a mobile robot, which is not driven by wheels but moves by a frictional force between a spin mop and a floor without wheels, it is difficult to correct a position value, input by a lower image sensor, by measuring a number of rotations of the wheel. In order to solve the problem, it is an object of the present disclosure to provide a mobile robot, in which a position of the mobile robot may be detected accurately without using a rotation speed of a wheel-less spin mop.

Further, in a cleaner for mopping the floor with a wet floor cloth by the spinning of the spin mop without wheels, it is another object of the present disclosure to provide a mobile robot, in which a position of the mobile robot may be detected accurately by using a lower image sensor without hindering, or being hindered by, the mopping of the spin mop.

In addition, in a cleaner for mopping the floor with a wet floor cloth by the spinning of the spin mop without wheels, it is yet another object of the present disclosure to provide a mobile robot, in which a lower image sensor may acquire lower images while there is no foreign matter on the floor, and a single lower image sensor may accurately detect rotation and movement of the mobile robot.

It is still another object of the present disclosure to provide a mobile robot, including a spin mop which slips while moving, and a method of calculating a moving distance of the mobile robot.

It is still another object of the present disclosure to provide a mobile robot, in which for effective mopping and traveling of a robot cleaner, a frictional force between a floor cloth and a floor surface increases regardless of a change in water level of a water tank, and the mobile robot may travel accurately while traveling in a pattern for thorough cleaning.

The objects of the present disclosure are not limited to the aforementioned objects and other objects not described herein will be clearly understood by those skilled in the art from the following description.

In accordance with an aspect of the present disclosure, the above and other objects can be accomplished by providing a mobile robot, including: a body; a left spin mop which is rotatably installed at the body and supports the body; a right spin mop which is rotatably installed at the body and supports the body; a left mop motor which provides a driving force to the left spin mop and is installed at the body: a right mop motor which provides a driving force to the right spin mop and is installed at the body; and a sensing module which is disposed at a lower surface of the body, and obtains at least any one data of a moving distance or a moving speed during a predetermined period of time by detecting a lower part of the body, wherein the sensing module is disposed forward of a virtual central horizontal line formed by connecting a spin shaft of the left spin mop and a spin shaft of the right spin mop.

In accordance with another aspect of the present disclosure, the above and other objects can be accomplished by providing a mobile robot, including: a body; a left spin mop, which is rotatably installed at the body and supports the body, and a right spin mop which is rotatably installed at the body and supports the body; a left mop motor, which provides a driving force to the left spin mop and is installed at the body, and a right mop motor which provides a driving force to the right spin mop and is installed at the body; and a sensing module which is disposed at a lower surface of the body, and obtains at least any one data of a moving distance or a moving speed during a predetermined period of time by detecting a lower part of the body, wherein the sensing module is disposed between a virtual front horizontal line, formed by connecting a front end of the left spin mop and a front end of the right spin mop, and a virtual rear horizontal line formed by connecting a rear end of the left spin mop and a rear end of the right spin mop.

In addition, the mobile robot may further include a left caster and a right caster which support the body and are in contact with a floor.

Moreover, the mobile robot may further include a sweep module which is spaced apart from and in front of the spin mops in the body, and collects foreign matter from the floor.

Furthermore, the mobile robot may further include a water tank which stores water to be supplied to the mop module, and is disposed at the body.

Here, the sensing module may be disposed behind a virtual front horizontal line formed by connecting a front end of the left spin mop and a front end of the right spin mop.

The sensing module may be disposed behind the left caster and the right caster.

The sensing module may be disposed on a virtual central vertical line, which vertically intersects the central horizontal line at a center of the virtual central horizontal line formed by connecting the spin shaft of the left spin mop and the spin shaft of the right spin mop.

The center of the sweep module may be disposed on the virtual central vertical line.

The sweep module may be disposed in front of the sensing module.

The water tank may be disposed behind the sensing module.

The center of the water tank may be disposed behind a virtual rear horizontal line formed by connecting a rear end of the left spin mop and a rear end of the right spin mop.

The sensing module may be biased toward the front horizontal line, between the front horizontal line and the rear horizontal line.

Further, the sensing module may be biased toward the rear horizontal line, between the central horizontal line and the rear horizontal line.

In accordance with yet another aspect of the present disclosure, the above and other objects can be accomplished by providing a mobile robot, including: a body which forms an exterior; a mop module, having a spin mop which is disposed at a lower portion of the body and is disposed and rotatable transversely when viewed from above, a spin shaft which is perpendicular to a rotary plate, and a mop driving part which is connected to the spin shaft and provides a driving force to the spin mop; an encoder which obtains any one or more data of an angular speed, a rotation direction, a number of rotations, and an inclination of the rotary plate, and transmits the obtained data to a controller; a sensing module which is disposed at the body, and obtains at least any one data of a moving distance or a moving speed during a predetermined period of time by detecting external circumstances; and a controller configured to calculate a moving distance or a rotation angle based on the data obtained by the encoder, and to correct the moving distance or the rotation angle based on the data obtained by the sensing module.

A storage may store data about an average slip rate for a general floor material, which falls within a predetermined category. By correcting a moving distance of the mobile robot, which is obtained without consideration of the slip rate, based on the average slip rate stored in the storage, the controller may calculate a final moving distance.

The sensing module may include an obstacle sensor configured to sense a position of a nearby obstacle. The obstacle sensor may measure a distance between the obstacle and the mobile robot, and may calculate a relative velocity of the mobile robot. The controller may calculate an instantaneous slip rate based on the calculated relative velocity, and may calculate the final moving distance by correcting the moving distance of the mobile robot, which is obtained without consideration of the slip rate, based on the instantaneous slip rate.

The sensing module may further include a lower image sensor for obtaining lower image data. The lower image sensor may measure a position variation of the mobile robot at a specific time. The controller may calculate an instantaneous slip rate based on the position variation, and may calculate the final moving distance by correcting the moving distance of the mobile robot, which is obtained without consideration of the slip rate. Alternatively, the controller may directly calculate a final moving distance based on the measured position variation.

The lower image sensor may be disposed behind a collecting module which performs dry-type cleaning. The lower image sensor may be disposed behind a spin mope which performs wet-type cleaning.

The mobile robot may further include a caster which supports load of the mobile robot, and a caster wheel which is disposed on a bottom surface of the caster. The sensing module may further include a wheel sensor for sensing a number of rotations of the caster wheel. The wheel sensor may sense the number of rotations of the caster wheel. The controller may calculate a moving distance based on the number of rotations of the caster wheel. If slip of the caster wheel does not occur, the controller may calculate a final moving distance of the mobile robot based on the number of rotations of the caster wheel. If slip partially occurs in the caster wheel, the controller may calculate an instantaneous slip rate and may calculate a final moving distance by correcting a moving distance of the mobile robot, which is obtained without consideration of the slip rate.

The mobile robot may include at least two or more sensing modules which are spaced apart from each other. The spaced-apart sensing modules may obtain different data. The controller may calculate a final rotation angle by correcting a rotation angle of the mobile robot, which is obtained without consideration of the slip rate, based on a difference in the data.

Details of other embodiments are included in the detailed description and the accompanying drawings.

According to the present disclosure, a mobile robot and a method of calculating a moving distance of the mobile robot has one or more of the following effects.

Firstly, by storing an average slip rate in a storage, and by correcting a moving distance based on the stored average slip rate, a final moving distance may be calculated accurately for a floor surface formed of a general material.

Secondly, by detecting a position of a nearby obstacle using an obstacle sensor, calculating a relative velocity and an instantaneous slip rate based on the detected position, and correcting a moving distance based on the instantaneous slip rate, a final moving distance may be calculated more accurately.

Thirdly, by measuring a position variation on an X-Y plane of the mobile robot, and correcting a moving distance based on the measured position variation, a final moving distance may be calculated more accurately.

Fourthly, by providing a caster for supporting the mobile robot, a caster wheel provided for the caster, and a wheel sensor for measuring a number of rotations of the caster wheel, and by calculating a moving distance based on the number of rotations of the caster wheel, a final moving distance may be calculated more accurately.

Fifthly, based on a difference in data obtained by spaced-apart two or more sensing modules, a final moving distance may be calculated more accurately.

Sixthly, in the present disclosure, a lower image sensor is disposed on a central vertical line of a body, and is disposed forward of a virtual central horizontal line, formed by connecting a spin shaft of a left spin mop and a spin shaft of the right spin mop, such that a possibility of malfunction in the lower image sensor may be reduced, which may occur when the floor is wiped with water by mopping of the spin mops. Further, as the position of the sensor deviates from the center of rotation (at a position parallel to the central horizontal line) of the mobile robot, a rotating motion of the mobile robot may be detected.

Seventhly, in the present disclosure, a lower image sensor is disposed on a central vertical line of a body, and is disposed forward of a virtual central horizontal line, formed by connecting a spin shaft of a left spin mop and a spin shaft of the right spin, such that the lower image sensor may first detect a carpet and may prevent the wheel-less spin mop from climbing the carpet.

Eighthly, in the present disclosure, a lower image sensor is disposed on a central vertical line of a body, and is disposed between a virtual central horizontal line, formed by connecting a spin shaft of a left spin mop and a spin shaft of the right spin, and a rear horizontal line, such that foreign matter on the floor may be removed by the mopping of the spin mops, thereby reducing a sensing error occurring due to the foreign matter. Further, as the position of the sensor deviates from the center of rotation (at a position parallel to the central horizontal line) of the mobile robot, a rotating motion of the mobile robot may be detected.

Ninthly, in the present disclosure, a body has a circular shape, and a dry-type module does not protrude outside of the body, such that the mobile robot may rotate freely at any position in an area to be cleaned. Further, a wide width of an agitator may be maintained, allowing a wide range of cleaning, and collecting of a relatively large foreign material and mopping of the floor may be performed at the same time.

However, the effects of the present disclosure are not limited to the aforesaid, and other effects not described herein will be clearly understood by those skilled in the art from the following description of the appended claims.

DETAILED DESCRIPTION OF THE PREFERRED EMBODIMENTS

Figure 1:
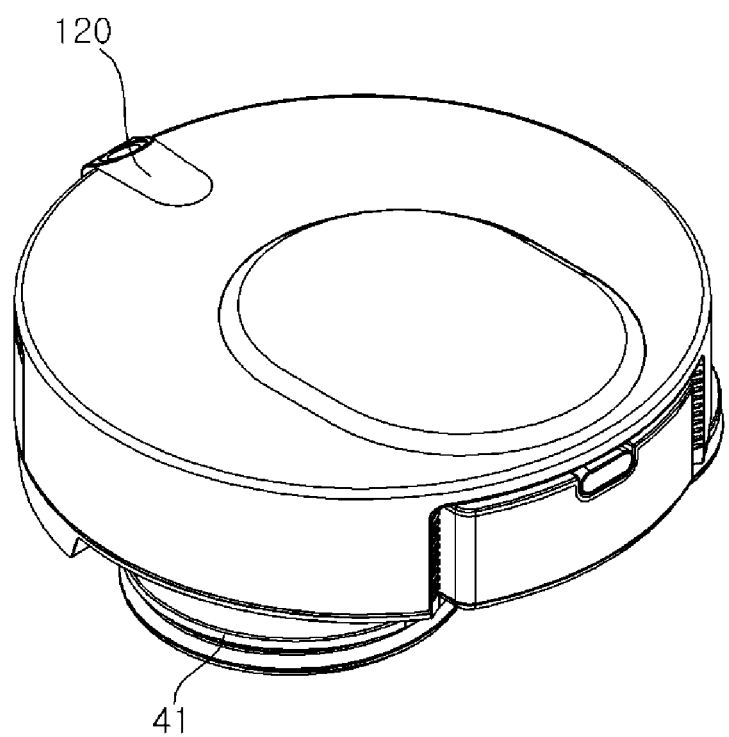
FIG. 1 is a perspective view of a mobile robot according to an embodiment of the present disclosure.
Figure 1:
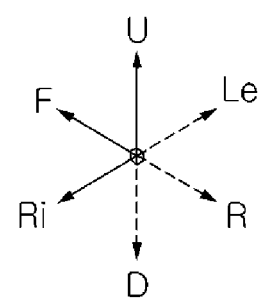
Figure 2:
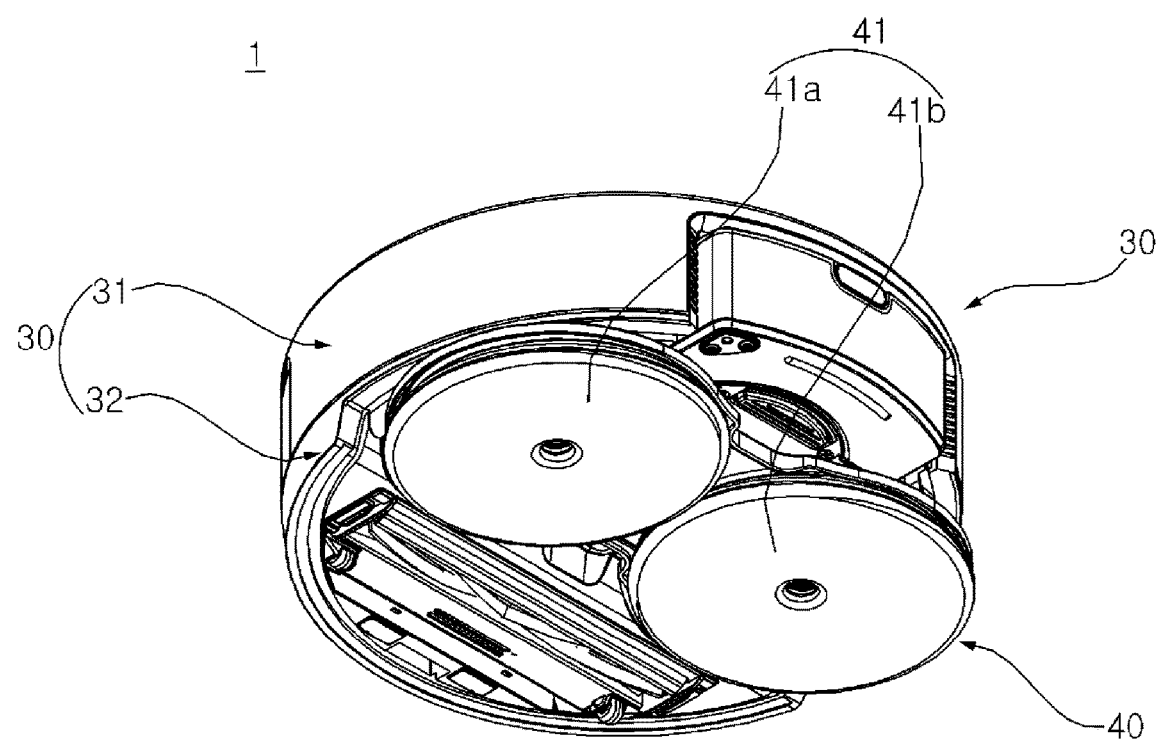
FIG. 2 is a perspective view illustrating a bottom surface of a mobile robot according to an embodiment of the present disclosure.

Advantages and features of the present disclosure and methods for accomplishing the same will be more clearly understood from exemplary embodiments described below with reference to the accompanying drawings. However, the present disclosure is not limited to the following embodiments, but may be implemented in various different forms. The embodiments are provided only to complete disclosure of the present disclosure and to fully provide a person having ordinary skill in the art, to which the present disclosure pertains, with the category of the present disclosure, and the present disclosure will be defined by the scope of the appended claims. Wherever possible, like reference numerals generally denote like elements through the specification.

In the following description, the terms indicating directions, such as "front (F)," "rear (R)," "left (Le)," "right (RI)," "up (U)," "down (D)," and the like, are defined based on a traveling direction of a mobile robot 1. As for a direction of a charging apparatus, a direction, in which the mobile robot is docked on the charging apparatus, is defined as a front direction, and a direction opposite to the front direction is defined as a rear direction. A direction of the left side/right side of the charging apparatus may be determined based on a position when the charging apparatus is viewed from above. These terms, however, are used merely to provide a better understanding of the present disclosure, and it is apparent that the directions can be defined differently by difference references.

For example, a direction parallel to a virtual line, formed by connecting central axes of a left spin mop and a right spin mop, is defined as a left-right direction; a direction, which vertically intersects with the left-right direction, is parallel to the central axes of the spin mops, or has an error angle of less than 5 degrees, is defined as an up-down direction; and a direction, which vertically intersects with the left-right direction and the up-down direction, is defined as a front-rear direction. In this case, the front direction may refer to a main traveling direction of the mobile robot, or a main traveling direction of pattern traveling of the mobile robot. Here, the main traveling direction may refer to a value, obtained by summing up vectors of directions while traveling during a predetermined period of time.

The terms, "first," "second," "third," etc., used in this disclosure, do not necessarily denote any order, importance, or hierarchy, but rather the terms are used to merely distinguish one element from another. For example, an embodiment may be configured to include only a second element without a first element.

The term "floor cloth" used herein may be made of various materials, such as fabric or paper, and may be intended for repetitive use by washing or for one-time use.

The present disclosure may be applied to a mobile robot 1 which may be manually moved by a user, a robot cleaner which may move autonomously, and the like. The following description will be given using the mobile robot 1 as an example.

A mobile robot 1 according to an embodiment of the present disclosure includes a body 30 including a controller 200. The mobile robot 1 includes a mop module 40 configured to mop a floor while being in contact with the floor (surface to be cleaned). The mobile robot 1 includes a sweep module 2000 configured to collect foreign matter from the floor.

The mop module 40 is disposed on a lower side of the body 30 and supports the body 30. The sweep module 2000 is disposed on a lower side of the body 30 and supports the body 30. In the embodiment, the body 30 is supported by the mop module 40 and the sweep module 2000. The body 30 forms an exterior of the mobile robot 1. The body 30 is disposed to connect the mop module 40 and the sweep module 2000.

The mop module 40 may form an exterior. The mop module 40 is disposed on a lower side of the body 30 and behind the sweep module 2000. The mop module 40 provides a driving force for movement of the mobile robot 1. In order to move the mobile robot 1, the mop module 40 is preferably disposed at the rear of the mobile robot 1.

The mop module 40 includes at least one floor cloth part 411 which wipes the floor while rotating. The mop module 40 includes at least one spin mop 41, which when viewed from above, rotates clockwise or counter-clockwise. The spin mop 41 is in contact with the floor.

In the embodiment, the mop module 40 includes a pair of spin mops 41a and 41b. The pair of spin mops 41a and 41b rotate clockwise or counter-clockwise when viewed from above, and mops the floor while rotating. Of the pair of the spin mops 41a and 41b, a spin mop, which is located at the left side when viewed from the front in a traveling direction of the mobile robot 1, is defined as a left spin mop 41a, and a spin mop located at the right side is defined as a right spin mop 41b.

Each of the left spin mop 41a and the right spin mop 41b rotates about its own rotational axis. The rotational axis is disposed vertically. The left spin mop 41a and the right spin mop 41b may rotate independently of each other.

Each of the left spin mop 41a and the right spin mop 41b includes the floor cloth part 411, a rotary plate 412 and a spin shaft 414. Each of the left spin mop 41a and the right spin mop 41b includes a water accommodating part 413. The left spin mop 41a and the right spin mop 41b are rotatably installed at the body 30 and support the body 30. Further, the mobile robot 1 includes a mop motor (not shown), which provides a driving force for the left spin mop 41a and the right spin mop 41b, and is installed at the body 30. The mop motor includes a left mop motor (not shown) and a right mop motor (not shown). A rotational axis of the mop motor may extend vertically. The left mop motor and the right mop motor are symmetrical to each other with respect to a central vertical line Po.

The central vertical line Po refers to a line which is parallel to a front-rear direction, and passes the center of a geometric center Tc of the body 30. In this case, the central vertical line Po may be defined as a line which vertically intersects with a virtual line, formed by connecting a central axis of the left spin mop and a central axis of the right spin mop, and which passes through the geometric center Tc of the body 30.

The sweep module 2000 may form an exterior. The sweep module 2000 is disposed in front of the mop module 40. In order to prevent the mop module 40 from first coming into contact with foreign materials on the floor, the sweep module 2000 is preferably disposed at the front in a traveling direction of the mobile robot 1.

The sweep module 2000 is spaced apart from the mop module 40. The sweep module 2000 is disposed in front of the mop module 40 and is in contact with the floor. The sweep module 2000 collects foreign matter from the floor.

While being in contact with the floor, the sweep module 2000 collects foreign matter, located in front of the sweep module 2000, into the inside while the mobile robot 1 moves. The sweep module 2000 is disposed on a lower side of the body 30. The sweep module 2000 has a horizontal width which is smaller than a horizontal width of the mop module 40.

A caster 58 is disclosed on a lower side of the mobile robot 1, and partially supports the load of the mobile robot 1. The caster 58 may be disposed at the front of the mobile robot 1. The caster 58 may be disposed on both front sides of the mobile robot 1. The caster 58 may be disposed in front of the mop module 40. The caster 58 may be disposed in front of the sweep module 2000. The caster 58 has wheels to move the mobile robot 1.

The caster 58 supports the body 30, is in contact with the floor, and reduces a frictional force with the floor. The caster 58 may include a left caster and a right caster.

Hereinafter, the mobile robot 1 and a method of calculating a moving distance of the mobile robot 1 will be described below with reference to the accompanying drawings.

A sensing module 100 is a device for sensing a variety of information related to the motion or state of the mobile robot 1 or external circumstances thereof.

An encoder is disposed inside the body 30, and senses a rotation speed or a number of rotations of the mop unit 41. Specifically, as the load applied to the floor cloth part 411 increases, the rotation speed is reduced compared to a rotation signal (current value, voltage value, etc.) applied to the mop motor. In this case, load information may be obtained by using the encoder which senses rotation speed information.

The encoder is the sensing module 100, which obtains various data from the spin mop 41 of the mobile robot 1 and transmits the obtained data to the controller 200. The encoder measures an angular speed, direction of rotation, number of rotations, or inclination of a rotary plate 412, and may transmit the measured data to the controller 200. The inclination includes an angle of forward/rearward inclination and an angle of leftward/rightward inclination of the rotary plate 412 relative to the floor surface.

An obstacle sensor 120 senses an external obstacle which is located apart from the mobile robot 1. The mobile robot 1 may be provided with a plurality of obstacle sensors 120. The obstacle sensor 120 may sense obstacles located in front of the mobile robot 1. The obstacle sensor 120 may be disposed at the body 30. The obstacle sensor 120 may include an infrared sensor, an ultrasonic sensor, an RF sensor, a geomagnetic sensor, a Position Sensitive Device (PSD) sensor, and the like.

A lower image sensor 130 acquires external image information, i.e., image information of the floor (traveling surface). The lower image sensor 130 may use an optical flow sensor (OFS) for acquiring image information by using light. The optical flow sensor includes an image sensor for acquiring image information by capturing images, and a light source for adjusting an amount of light. The image sensor may include a lens. As such lens, a pan-focus lens having a short focal distance and a deep depth may be used.

The light source is disposed adjacent to the image sensor, and emits light onto a region which is captured by the image sensor.

The sensing module 100 may include a position signal sensor for determining a position by receiving an identification signal from an external source. For example, the position signal sensor may be an Ultra-Wide Band (UWB) sensor using an Ultra-Wide Band (UWB) signal. The controller 200 may identify the position of the mobile robot 1 based on the signal received by the position signal sensor.

The sensing module 100 may include a cliff sensor (not shown) for sensing the presence of a cliff on the floor. The cliff sensor may sense the presence of a cliff located forward or rearward of the mobile robot 1.

A gyro sensor senses a rotation direction and detects a rotation angle when the mobile robot 1 moves according to an operating mode. The gyro sensor detects an angular speed of the mobile robot 1, and outputs a voltage value which is proportional to the angular speed. The controller 200 calculates the direction and angle of rotation by using the voltage value output by the gyro sensor.

A wheel sensor 140 is connected to a caster wheel 51 to sense the number of rotations of the wheel. Here, the wheel sensor 140 may be a rotary encoder.

An acceleration sensor detects a change in speed of the mobile robot 1, for example, start, stop, a change of direction, a change in the mobile robot 1 due to collision with an object, and the like.

The mobile robot 1 includes the controller 200 for controlling autonomous traveling. The controller 200 may be implemented on a main PCB (Co) disposed in the body 30. The controller 200 may process a signal of the input part (not shown) or a signal input through the communicator (not shown). The controller 200 may control traveling of the mobile robot 1 by receiving a sensing signal of the sensing module 100.

The mobile robot 1 includes a storage 300 for storing a variety of information. The storage 300 may include a volatile or non-volatile recording medium. The storage 300 may store algorithms for controlling various motions of the mobile robot 1 to respond to errors.

Furthermore, the mobile robot 1 of the present disclosure includes a water tank 81 to store water. The water tank 81 is partially disposed in the body 30. The water tank 81 is disposed at a rear side of the body 30. Specifically, a portion of the water tank 81 may be exposed outside of the body 30. The water in the water tank 81 is supplied to each spin mop 41.

The mobile robot 1 of the present disclosure may further include a battery (not shown) which supplies power to the mop motor and the sweep module 2000.

When a bottom surface of the pair of spin mops 41a and 41b, which are symmetrical to each other with respect to the central vertical line Po, are horizontal to a horizontal plane, a robot cleaner may not travel in a stable manner, and it is difficult to control traveling of the robot cleaner. Accordingly, in the present disclosure, each spin mop 41 is inclined downward to an outer front side thereof. The slope and motion of the spin mop 41 will be described below.

Referring back to FIG. 3, FIG. 3 illustrates a point, at which a spin shaft Osa and a lower surface of the left spin mop 41a intersect, and a point at which a spin shaft Osb and a lower surface of the right spin mop 41b intersect. When viewed from the bottom, a direction in which the left spin mop 41a spins clockwise is defined as a first forward direction w1f, and a direction in which the left spin mop 41a spins counter-clockwise is defined as a first reverse direction w1r. When viewed from the bottom, a direction in which the right spin mop 41b spins counter-clockwise is defined as a second forward direction w2f, and a direction in which the right spin mop 41b spins clockwise is defined as a second reverse direction w2r. Further, when viewed from the bottom, "an acute angle, formed between a tilt direction of the lower surface of the left spin mop 41a and a left-right axis thereof," and "an acute angle, formed between a tilt direction of the lower surface of the right spin mop 41b and a left-right axis thereof," are defined as tilt direction angles Ag1a and Ag1b. The tilt direction angle Ag1a of the left spin mop 41a may be equal to the tilt direction angle Ag1b of the right spin mop 41b. Further, referring to FIG. 6, "an angle of the lower surface I of the left spin mop 41a with respect to a virtual horizontal plane H" and "an angle of the lower surface I of the right spin mop 41b with respect to a virtual horizontal plane H" are defined as tilt angles Ag2a and Ag2b.

In this case, a right end of the left spin mop 41a and a left end of the right spin mop 41b may come into contact with, or may be adjacent to, each other. Accordingly, a gap in mopping between the left spin mop 41a and the right spin mop 41b may be reduced.

When the left spin mop 41a spins, a point P1a of the lower surface of the left spin mop 41a, to which a maximum frictional force is applied from the floor, is located on the left side of a center of rotation Osa of the left spin mop 41a. As a greater load is transmitted to a ground surface at the point Pla of the lower surface of the left spin mop 41a than other points, the maximum frictional force may be generated at the point Pla. In the embodiment, the point Pla is located at a front left side of the center of rotation Osa, but in another embodiment, the point Pla may be disposed exactly at the left side or at the rear left side with respect to the center of rotation Osa.

When the right spin mop 41b spins, a point Plb of the lower surface of the right spin mop 41b, to which a maximum frictional force is applied from the floor, is located at the right side of a center of rotation Osb of the right spin mop 41b. As a greater load is transmitted to a ground surface at the point Plb of the lower surface of the right spin mop 41b than other points, the maximum frictional force may be generated at the point Plb. In the embodiment, the point Plb is located at a front right side of the center of rotation Osb, but in another embodiment, the point Plb may be disposed exactly at the right side or at the rear right side with respect to the center of rotation Osb.

The lower surface of the left spin mop 41a and the lower surface of the right spin mop 41b may be tilted. The tilt angles Ag2a and Ag2b of the left spin mop 41a and the right spin mop 41b may form an acute angle. The tilt angles Ag2a and Ag2b are at the points Pla and Plb, at which the maximum frictional force is exerted, and the entire lower area of the floor cloth part 411 may be formed in a small size to touch the floor during spinning of the left spin mop 41a and the right spin mop 41b.

Figure 6:
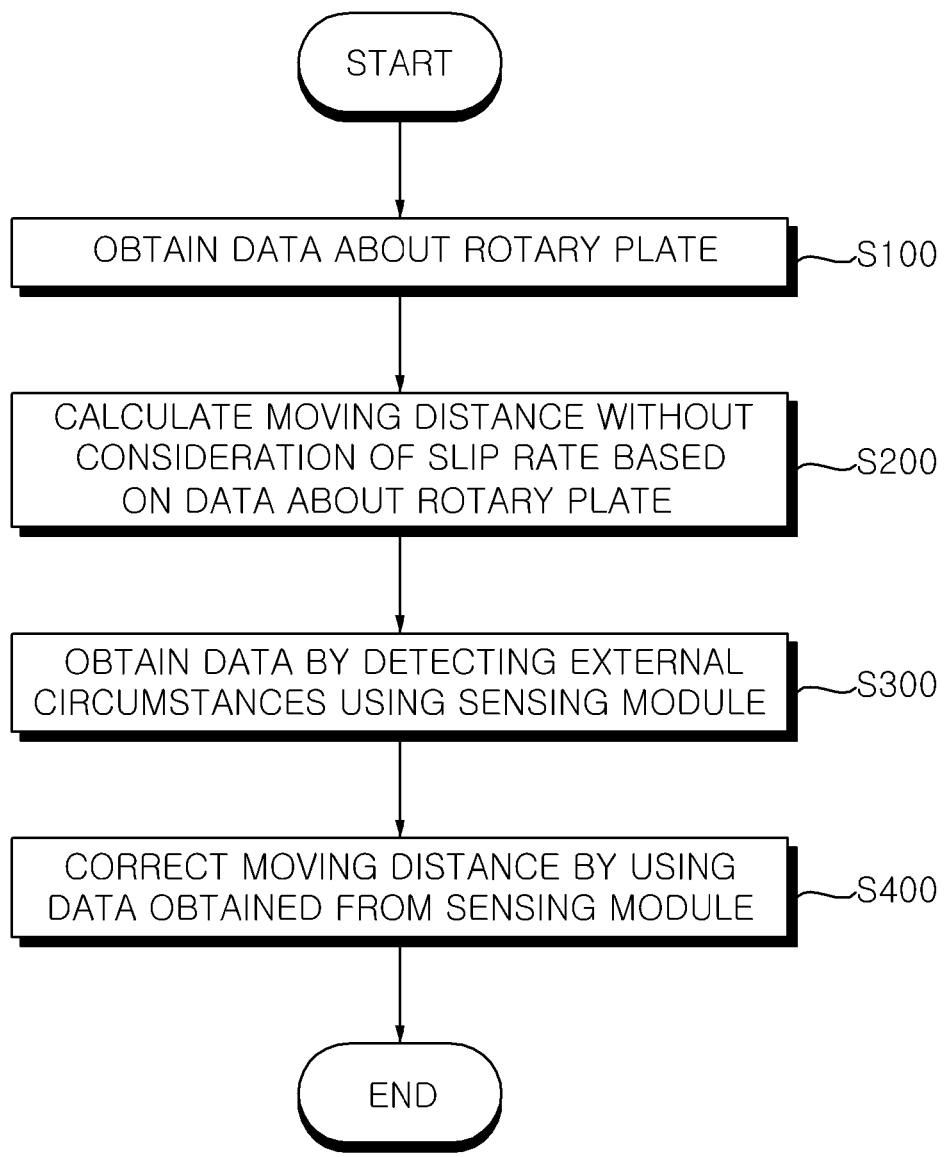
FIG. 6 is a block diagram schematically illustrating a processor for calculating a moving distance of a mobile robot according to an embodiment of the present disclosure.
Figure 7:
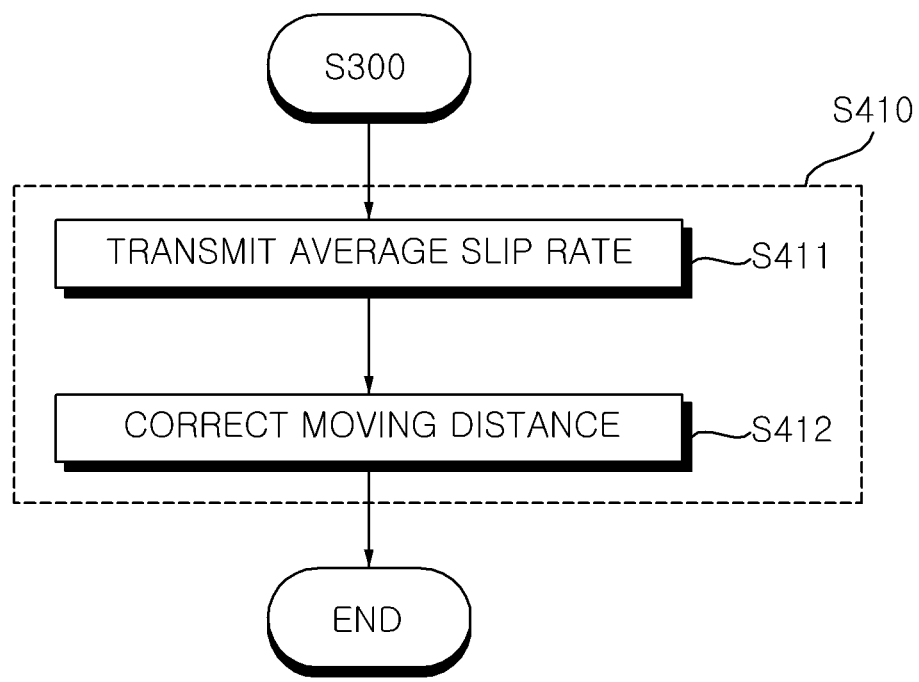
FIG. 7 is a block diagram schematically illustrating a method of correcting a moving distance according to a first embodiment of the present disclosure.
Figure 8:
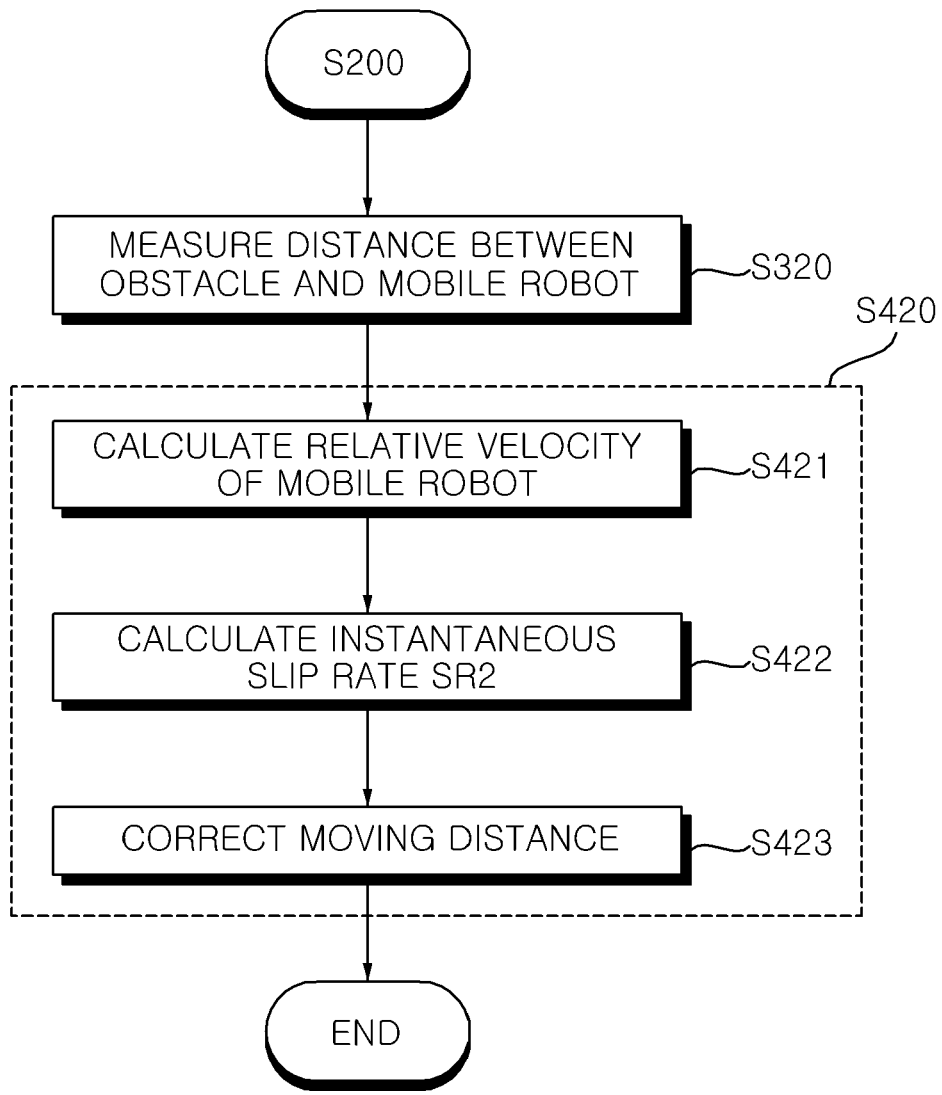
FIG. 8 is a block diagram schematically illustrating a method of correcting a moving distance according to a second embodiment of the present disclosure.
Figure 9:
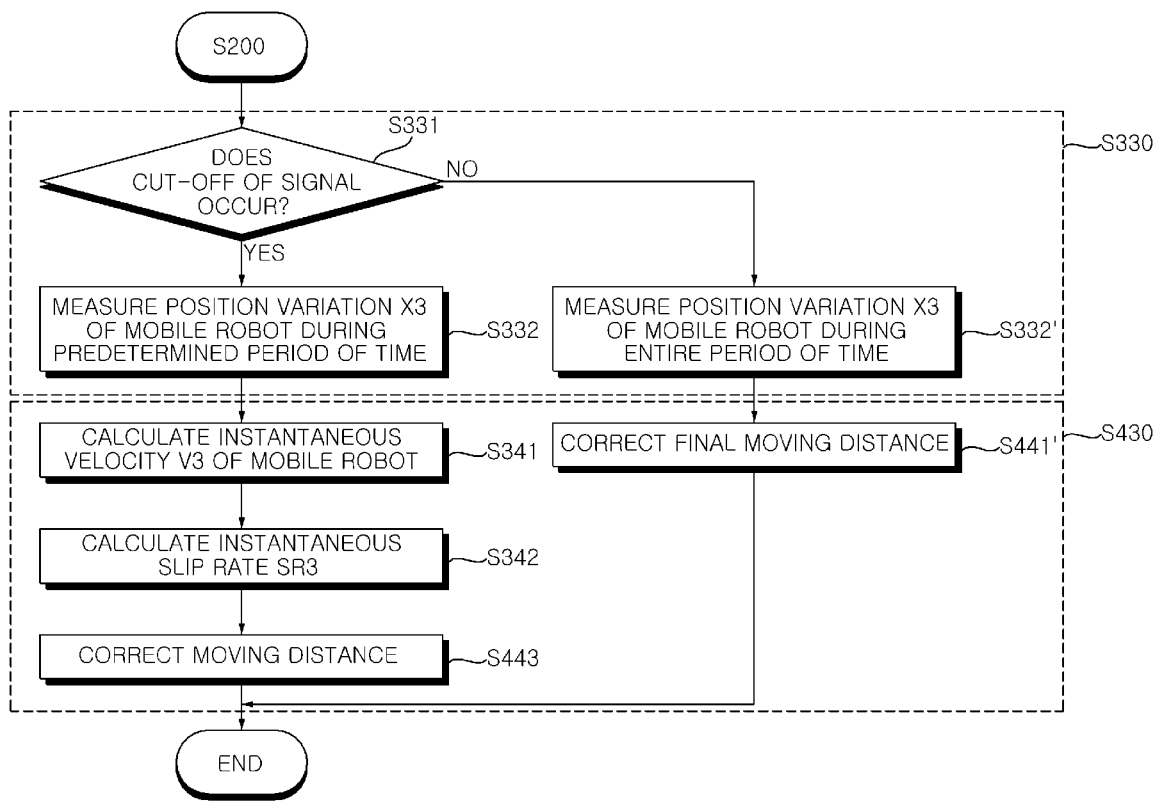
FIG. 9 is a block diagram schematically illustrating a method of correcting a moving distance according to a third embodiment of the present disclosure.
Figure 10:
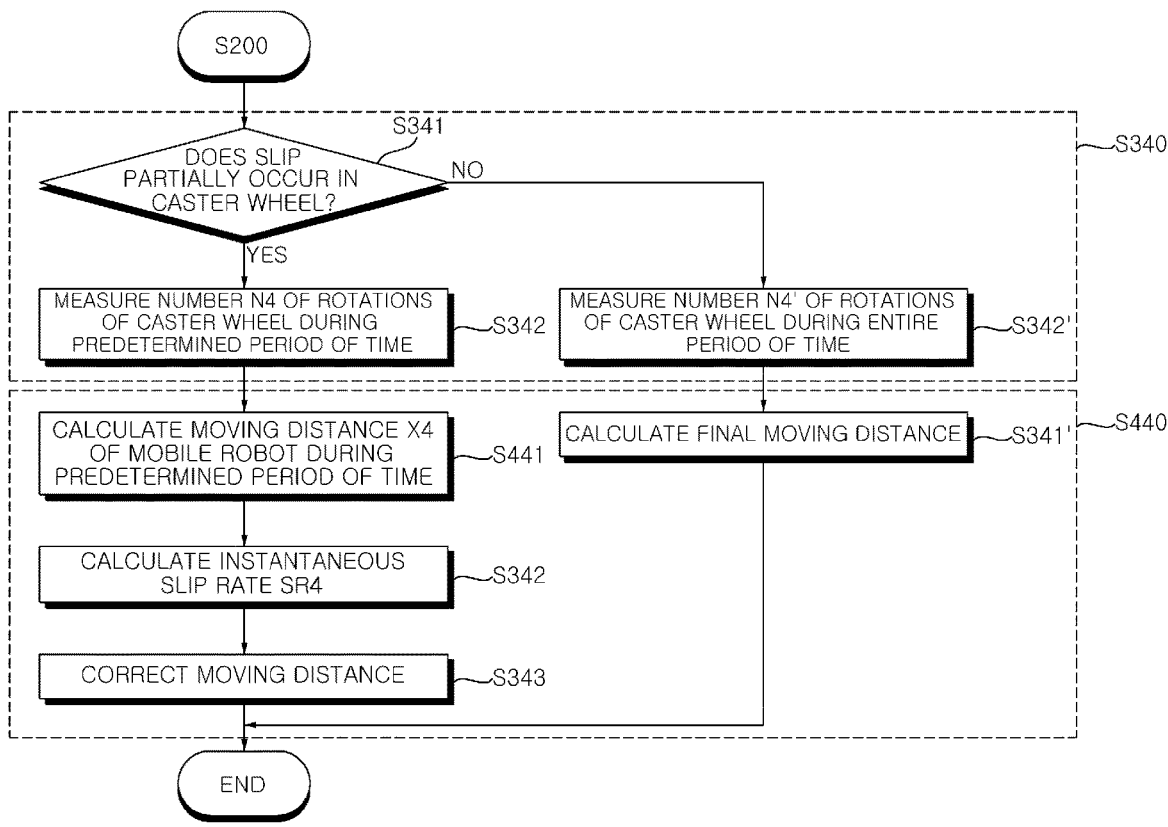
FIG. 10 is a block diagram schematically illustrating a method of correcting a moving distance according to a fourth embodiment of the present disclosure.
Figure 11:
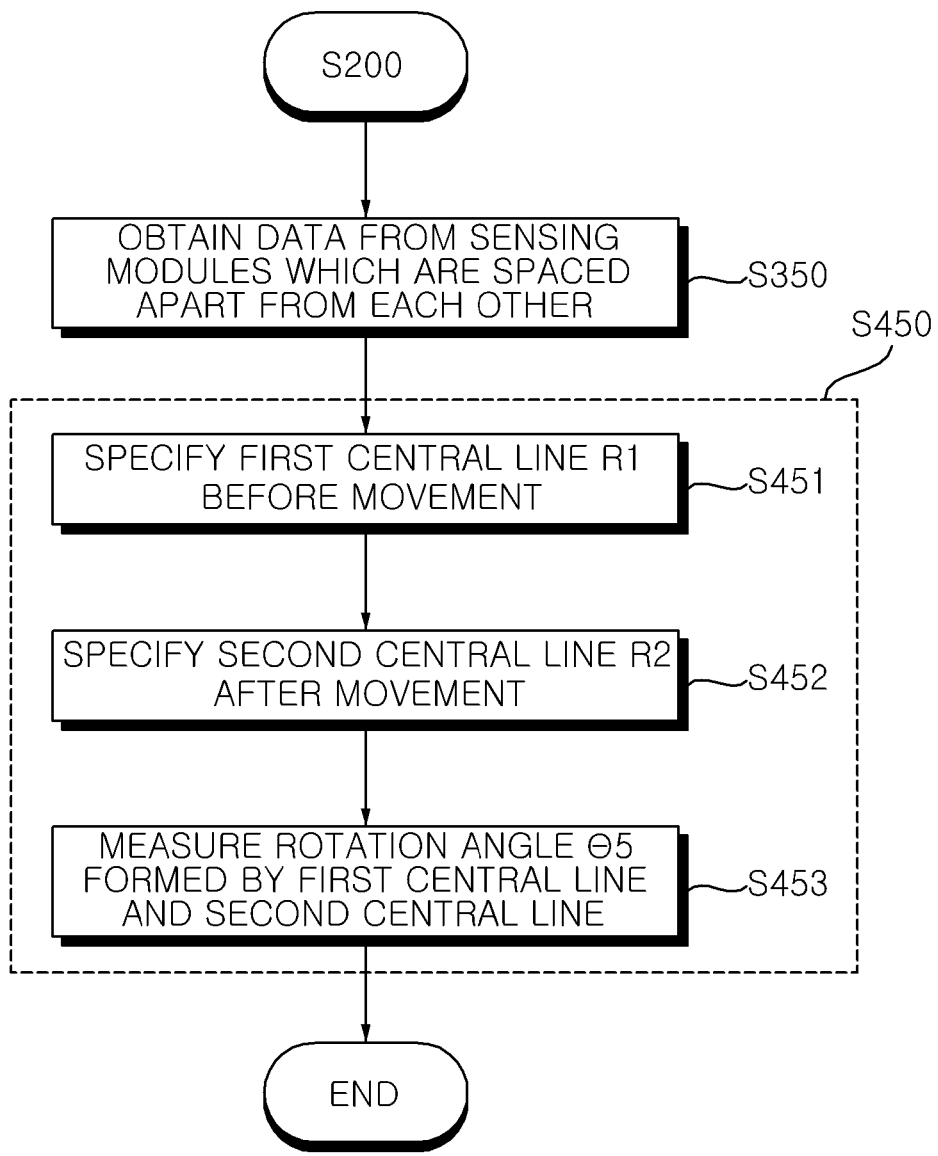
FIG. 11 is a block diagram schematically illustrating a method of correcting a rotation angle according to a fifth embodiment of the present disclosure.

The overall lower surface of the left spin mop 41a is inclined leftwards and downwards. The overall lower surface of the right spin mop 41b is inclined rightwards and downwards. Referring to FIG. 6, the lower surface of the left spin mop 41a has a lowest point Pla on the left side. The lower surface of the left spin mop 41a has a highest point Pha on the right side. The lower surface of the right spin mop 41b has a lowest point Plb on the right side. The lower surface of the right spin mop 41b has a highest point Phb on the left side.

Depending on embodiments, the tilt direction angles Ag1a and Ag1b may be zero degrees. Further, depending on embodiments, when viewed from the bottom, a tilt direction of the lower surface of the left spin mop 41a may form the tilt direction angle Ag1a in a clockwise direction with respect to the left-right axis, and a tilt direction of the lower surface of the right spin mop 41b may form the tilt direction angle Ag1b in a counter-clockwise direction with respect to the left-right axis. In the embodiment of the present disclosure, when viewed from the bottom, a tilt direction of the lower surface of the left spin mop 41a may form the tilt direction angle Ag1a in a counter-clockwise direction with respect to the left-right axis, and a tilt direction of the lower surface of the right spin mop 41b may form the tilt direction angle Ag1b in a clockwise direction with respect to the left-right axis.

The cleaner 1 moves by a frictional force with a ground surface, which is generated by the mop module 40.

The mop module 40 may generate "a forward movement frictional force" for moving the body 30 forward, or a "rearward movement frictional force" for moving the body 30 backwards. The mop module 40 may generate a "leftward moment frictional force" for turning the body 30 to the left, or a "rightward moment frictional force" for turning the body 30 to the right. The mop module 40 may generate a frictional force by combining any one of the forward movement frictional force and the rearward movement frictional force with any one of the leftward moment frictional force and the rightward moment frictional force.

In order for the mop module 40 to generate the forward movement frictional force, the left spin mop 41a spins at a predetermined rpm R1 in the first forward direction w1f, and the right spin mop 41b spins at the predetermined rpm R1 in the second forward direction w2f.

In order for the mop module 40 to generate the rearward movement frictional force, the left spin mop 41a spins at a predetermined rpm R2 in the first reverse direction w1r, and the right spin mop 41b spins at the predetermined rpm R2 in the second reverse direction w2f.

In order for the mop module 40 to generate the rightward moment frictional force, the left spin mop 41a spins at a predetermined rpm R3 in the first forward direction w1f, and the right spin mop 41b (i) spins in the second reverse direction w2r, (ii) is stopped without spinning, or (iii) spins at an rpm R4, which is less than the rpm R3, in the second forward direction w2f.

In order for the mop module 40 to generate the leftward moment frictional force, the right spin mop 41b spins at a predetermined rpm R5 in the second forward direction w2f, and the left spin mop 41a (i) spins in the first reverse direction w1f, (ii) is stopped without spinning, or (iii) spins at an rpm R6, which is less than the rpm R5, in the first forward direction w1f.

Hereinafter, an arrangement of each element will be described below, which may improve stability in a left-right direction and a front-rear direction while increasing a frictional force of the spin mops 41 located at the left and right sides, and allowing safe traveling regardless of a water level in a water tank 81.

In order to increase a frictional force of the spin mop 41 and to prevent eccentricity from occurring in one direction when the mobile robot 1 rotates, a battery Bt and the mop motor 61, which are relatively heavy, may be disposed above the spin mop 41.

Specifically, the left mop motor is disposed above the left spin mop 41a, and the right mop motor is disposed above the right spin mop 41b. That is, at least a portion of the left mop motor may overlap vertically with the left spin mop 41a. It is preferred that the entire portion of the left mop motor may overlap vertically with the left spin mop 41a. At least a portion of the right mop motor may overlap vertically with the right spin mop 41b. It is preferred that the entire portion of the right mop motor may overlap vertically with the right spin mop 41b.

More specifically, the left mop motor and the right mop motor may overlap vertically with a virtual central horizontal line CHL, formed by connecting the spin shaft Osa of the left spin mop 41a and the spin shaft Osb of the right spin mop 41b. It is preferred that a center of mass MCa of the left mop motor and a center of mass MCb of the right mop motor may overlap vertically with the virtual central horizontal line CHL which is formed by connecting the spin shaft Osa of the left spin mop 41a and the spin shaft Osb of the right spin mop 41b. Alternatively, a geometric center of the left mop motor and a geometric center of the right mop motor may overlap vertically with the virtual central horizontal line HL which is formed by connecting the spin shaft Osa of the left spin mop 41a and the spin shaft Osb of the right spin mop 41b. In this case, the left mop motor and the right mop motor are symmetrical to each other with respect to a central vertical line Po.

As the center of mass MCa of the left mop motor and the center of mass MCb of the right mop motor are symmetrical to each other without deviating from each spin mop 41, a frictional force of the spin mop 41 may increase, and driving performance and horizontal balance may be maintained.

Hereinafter, the spin shaft OSa of the left spin mop 41a is defined as a left spin shaft Osa, and the spin shaft Osb of the right spin mop 41b is defined as a right spin shaft Osb.

As the water tank 81 is disposed behind the central horizontal line CHL, and the amount of water in the water tank 81 is variable, the left mop motor may be biased leftward from the left spin shaft Osa in order to maintain a stable balance in the front-rear direction regardless of a water level in the water tank 81. The left mop motor may be biased to the front left side from the left spin shaft Osa. It is preferred that the geometric center or the center of mass MCa of the left mop motor is biased leftward from the left spin shaft Osa, or the geometric center or the center of mass MCa of the left mop motor is biased to the front left side from the left spin shaft Osa.

The right mop motor may be biased rightward from the right spin shaft Osb. The right mop motor may be biased to the front right side from the right spin shaft Osb. It is preferred that the geometric center or the center of mass MCb of the right mop motor is biased rightward from the right spin shaft Osb, or the geometric center or the center of mass MCb of the right mop motor is biased to the front right side from the right spin shaft Osb.

As the left mop motor and the right mop motor apply pressure at positions which are biased toward an outer front side from the center of each spin mop 41, the pressure is concentrated on the outer front side of each spin mop 41, such that driving performance may be improved by the rotational force of the spin mop 41.

The left spin shaft Osa and the right spin shaft Osb are disposed behind the center of the body 30. The central horizontal line CHL is disposed behind a geometric center of the body 30 and a center of mass WC of the mobile robot 1. The left spin shaft Osa and the right spin shaft Osb are spaced apart equally from the central vertical line Po.

In the embodiment of the present disclosure, a single battery Bt is installed. At least a portion of the battery Bt is disposed on the left spin mop 41a and the right spin mop

41b. As the battery Bt, which is relatively heavy, is disposed on the spin mop 41, a frictional force of the spin mop 41 may increase, thereby reducing eccentricity occurring due to the rotation of the mobile robot 1.

Specifically, a portion of the left side of the battery Bt may vertically overlap with the left spin mop 41a, and a portion of the right side of the battery Bt may vertically overlap with the right spin mop 41b. The battery Bt may vertically overlap with the central horizontal line CHL and may vertically overlap with the central vertical line Po.

More specifically, a center of mass BC or a geometric center of the battery Bt may be disposed on the central vertical line Po, and may be disposed on the central horizontal line CHL. In this case, the center of mass BC or the geometric center of the battery Bt may be disposed on the central vertical line Po, may be disposed forward of the central horizontal line CHL, or may be disposed behind the geometric center Tc of the body 30.

The center of mass BC or the geometric center of the battery Bt may be disposed forward of the water tank 81 or the center of mass PC of the water tank 81. The center of mass BC or the geometric center of the battery Bt may be disposed behind a center of mass SC of the sweep module 2000.

As one battery Bt is interposed between the left spin mop 41a and the right spin mop 41b, and is disposed on the central horizontal line CHL and the vertical line Po, the heavy battery Bt maintains the balance during the spinning of the spin mops 41, and puts weight on the spin mops 41, thereby increasing a frictional force of the spin mops 41.

The battery Bt may be disposed at the same height (height of a lower end) as the left mop motor and the right mop motor. The battery Bt may be interposed between the left mop motor 61a and the right mop motor 61b. The battery Bt is disposed in an empty space between the left mop motor and the right mop motor.

At least a portion of the water tank 81 is disposed on the left spin mop 41a and the right spin mop 41b. The water tank 81 may be disposed behind the central horizontal line CHL, and may vertically overlap with the central vertical line Po.

More specifically, the center of mass PC or a geometric center of the water tank 81 may be disposed on the central vertical line Po and disposed forward of the central horizontal line CHL. In this case, the center of mass PC or the geometric center of the water tank 81 may be disposed on the central vertical line Po and disposed behind the central horizontal line CHL. Here, the position of the center of mass PC or the geometric center of the water tank 81, which is disposed behind the central horizontal line CHL, indicates that the center of mass PC or the geometric center of the water tank 81 vertically overlaps with one region which is positioned behind the central horizontal line CHL. In this case, the center of mass PC or the geometric center of the water tank 81 may vertically overlap with the body 30 without deviating from the body 30.

The center of mass PC or the geometric center of the water tank 81 may be disposed behind the center of mass BC of the battery Bt. The center of mass PC or the geometric center of the water tank 81 may be disposed behind the center of mass SC of the sweep module 2000.

The water tank 81 may be disposed at the same height (height of a lower end) or on the same plane as the left mop motor and the right mop motor. The water tank 81 may be disposed behind a space between the left mop motor and the right mop motor.

A portion of each spin mop 41 vertically overlaps with the body 30, the other portion of each spin mop 41 is exposed outside of the body 30. A percentage of the vertically overlapping portion of the left spin mop 41a and the right spin mop 41b with the body 30 is preferably in a range of 85% to 95% of each spin mop 41. Specifically, an included angle between a line, formed by connecting the right end of the body 30 and the right end of the right spin mop 41b, and a vertical line, formed by horizontally connecting the right end of the body 30 and the central vertical line Po, may be in a range of zero degrees to five degrees.

A length of a region of each spin mop 41, which is exposed outside of the body 30, is preferably in a range of ½ to ⅐ of a radius of each spin mop 41. The length of the region of each spin mop 41, which is exposed outside of the body 30, may refer to a distance between one end of each pin mop 41, which is exposed outside of the body 30, to the spin shaft of each spin mop 41.

A distance between the end of the region of each spin mop 41, which is exposed outside of the body 30, and the geometric center Tc of the body 30 may be greater than a mean radius of the body 30.

By considering a relationship with the sweep module 2000, a position, at which each spin mop 41 is exposed, is between a side portion and a rear portion of the body 30. That is, if quadrants are sequentially positioned in a clockwise direction when the body 30 is viewed from below, the position, at which each spin mop 41 is exposed, may be located in the second quadrant or the third quadrant.

The sweep module 2000 is disposed forward of the spin mops 41, the battery Bt, the water tank 81, the right mop motor, and the left mop motor in the body 30.

The center of mass PC or a geometric center of the sweep module 2000 may be disposed on the central vertical line Po, and may be disposed forward of the geometric center Tc of the body 30. The body 30 may have a circular shape when viewed from the top, and the base 32 may have a circular shape. The geometric center Tc of the body 30 refers to its center when the body 30 has a circular shape. Specifically, when viewed from the top, the body 30 is a circle with a radius error being less than 3%.

Specifically, the center of mass SC or the geometric center of the sweep module 2000 may be disposed on the central vertical line Po, and may be disposed forward of the center of mass BC of the battery Bt, the center of mass of PC of the water tank 81, the center of mass MCa of the left mop motor, the center of mass MCb of the right mop motor, and the center of mass WC of the mobile robot.

It is preferred that the center of mass SC or the geometric center of the sweep module 2000 is disposed forward of the central horizontal line CHL and the front end of the spin mops 41.

As described above, the sweep module 2000 may include an agitator 2200, and a sweep motor (not shown).

A rotational axis of the agitator 2200 is parallel to the central horizontal line CHL, and the center of the agitator 2200 is disposed on the virtual vertical line Po of the mobile robot, thereby allowing large foreign materials, introduced into the spin mops 41, to be removed effectively by the agitator 2200. The rotational axis of the agitator 2200 is disposed forward of the geometric center Tc of the body 30. A length of the agitator 2200 is preferably larger than a distance between the left spin shaft Osa and the right spin shaft Osb. The rotational axis of the agitator 2200 may be disposed adjacent to the front end of the spin mop 41.

The sweep module 2000 may further include a left caster 58a and a right caster 58b, which are provided on both ends thereof, and which come into contact with the floor. The left caster 58a and the right caster 58b may roll while being in contact with the floor, and may be moved vertically by an elastic force. The left caster 58*a* and the right caster 58*b* support the sweep module 2000 and a portion of the body 30.

The left caster 58*a* and the right caster 58*b* are disposed parallel to the central horizontal line CHL, and may be disposed forward of the central horizontal line CHL and the agitator 2200. A virtual line, formed by connecting the left caster 58*a* and the right caster 58*b*, may be disposed forward of the central horizontal line CHL, the agitator 2200, and the geometric center Tc of the body 30. In this case, the left caster 58*a* and the right caster 58*b* may be symmetrical to each other with respect to the central vertical line Po. The left caster 58*a* and the right caster 58*b* may be equally spaced apart from the central vertical line Po.

The geometric center Tc of the body 30, the center of mass WC of the mobile robot 1, the center of mass SC of the sweep module 2000, and the center of mass BC of the battery Bt are disposed in a virtual square, formed by sequentially connecting the left caster 58*a*, the right caster 58*b*, the right spin shaft Osb, and the left spin shaft Osa; and the battery Bt, which is relatively heavy, the left spin shaft Osa, and the right spin shaft Osb are disposed adjacent to the central horizontal line CHL. In this arrangement, a primary load of the mobile robot 1 is applied to the spin mops 41, and a remaining secondary load is applied to the left caster 58*a* and the right caster 58*b*.

Accordingly, the center of mass of the mobile robot 1, which is biased forward, may be maintained regardless of a water level in the water tank 81 which is disposed at the rear side. In this case, while increasing a frictional force of the spin mop 41, the center of mass WC of the mobile robot may be positioned near the geometric center Tc of the body 30, thereby enabling stable movement.

The center of mass WC of the mobile robot 1 may be disposed on the central vertical line Po; may be disposed forward of the central horizontal line HL; may be disposed forward of the center of mass BC of the battery BC; may be disposed forward of the center of mass PC of the water tank 81; may be disposed behind the center of mass SC of the sweep module 2000; and may be disposed behind the left caster 58*a* and the right caster 58*b*.

These elements may be disposed to be symmetrical to each other with respect to the central vertical line Po, or may be disposed by considering their weight, such that the center of mass WC of the mobile robot 1 may be positioned on the central vertical line Po. When the center of mass WC of the mobile robot 1 is positioned on the central vertical line Po, there is an effect of improving stability in a left-right direction.

The sensing module 100 is disposed on a lower surface of the body 30, and senses a lower part of the body 30 to obtain at least one data of a moving distance or a moving speed during a predetermined period of time.

The sensing module 100 may be disposed forward of a virtual central horizontal line CHL, formed by connecting the spin shaft Osa of the left spin mop 41*a* and a spin shaft Osb of the right spin mop 41*b*. Specifically, the sensing module 100 includes a lower image sensor 130. The following description will be given by defining that the sensing module 100 is the lower image sensor 130.

It is preferred that the lower image sensor 130 is disposed behind a virtual front horizontal line (FHL), formed by connecting a front end of the left spin mop 41*a* and a front end of the right spin mop 41*b*. As the lower image sensor 130 is disposed between the front horizontal line (FHL) and the central horizontal line (CHL), there is an effect in that a possibility of malfunction in the lower image sensor 130 may be reduced, which may occur when the floor is wiped with water by mopping of the spin mops 41*a* and 41*b*. Also, as the lower image sensor 130 is positioned eccentrically from the center of rotation (at a position parallel to the central horizontal line (CHL)) of the mobile robot 1, there is an effect in that a rotating motion of the mobile robot 1 may be detected.

In this case, when the body 30 has a circular shape, and the mobile robot 1 is set to rotate about a geometric center Tc of the body 30, it is preferred that the lower image sensor 130 is positioned eccentrically from the geometric center Tc of the body 30 between the front horizontal line FHL and the central horizontal line CHL.

The lower image sensor 130 may be disposed behind the left caster 58*a* and the right caster 58*b*. Accordingly, the agitator 220 removes foreign matter from the floor, thereby reducing a sensing error caused by the foreign matter.

The lower image sensor 130 may be disposed on a virtual central vertical line Po, which vertically intersects the central horizontal line CHL at the center of the virtual central horizontal line CHL formed by connecting the spin shaft Osa of the left spin mop 41*a* and the spin shaft Osb of the right spin mop 41*b*.

The center Sc of the sweep module 2000 is disposed on the virtual vertical line Po, and the sweep module 2000 may be disposed forward of the lower image sensor 130. The water tank 81 may be disposed behind the lower image sensor 130.

The center PC of the water tank 81 may be disposed behind a virtual rear horizontal line RHL, formed by connecting a rear end of the left spin mop 41*a* and a rear end of the right spin mop 41*b*.

The lower image sensor 130 may be disposed between the virtual front horizontal line FHL, formed by connecting the front end of the left spin mop 41*a* and the front end of the right spin mop 41*b*, and the virtual rear horizontal line RHL, formed by connecting the rear end of the left spin mop 41*a* and the rear end of the right spin mop 41*b*.

It is preferred that the lower image sensor 130 may be biased toward the front horizontal line FHL, between the front horizontal line FHL and the rear horizontal line RHL. Accordingly, after the sweep module 2000 removes foreign matter from the floor, the lower image sensor 130 may scan the floor before the floor is mopped by the spin mops 41, such that the lower image sensor 130 may acquire and sense images accurately.

Referring to FIGS. 1 to 5, a mobile robot and a method of calculating a moving distance of the mobile robot will be described below.

The controller 200 may calculate a moving distance L of the mobile robot 1 based on data obtained by the encoder.

When the rotary plate 412 rotates, a portion of force slips to clean the floor, and the remaining force is used to move the mobile robot 1. That is, by calculating a force or energy which is generated by the rotation of the rotary plate 412, and by subtracting the slipping force or energy, a force or energy used for moving the mobile robot 1 may be calculated, such that an amount of movement of the mobile robot 1 may be identified.

A moving distance of the mobile robot 1 is proportional to an angular speed and a number of rotations of the rotary plate 412. If directions of rotation of the left spin mop 41*a* and the right spin mop 41*b* are different from each other, the mobile robot 1 moves in a predetermined direction, and if directions of rotation of the left spin mop 41*a* and the right spin mop 41*b* are the same, the mobile robot 1 may rotate. If an angular speed of the rotary plate 412 increases, the speed of the mobile robot 1 also increases. If a number of rotations of the rotary plate 412 increases, a moving distance of the mobile robot 1 also increases.

The moving distance of the mobile robot 1 varies depending on an inclination of the rotary plate 412 or a spin shaft. If the rotary plate 412 or the spin shaft is inclined, a portion of the rotary plate 412 comes into contact with the floor, and other portions thereof do not come into contact with the floor. If an inclination of the rotary plate 412 increases further, the contact portion between the rotary plate 412 and the floor is reduced, such that a load exerted on the contact portion increases and a frictional force at the contact portion also increases. If the inclination of the rotary plate 412 is inclined sideways or is inclined forwards/rearwards, a load exerted on the contact portion between the rotary plate 412 and the floor varies, such that a moving distance of the mobile robot 1 is different.

By comprehensively considering the angular speed, direction of rotation, number of rotations, and inclination of the rotary plate 412, a moving distance or a rotation angle L' may be calculated without considering a slip rate. In the following first to fifth embodiments, a correction method for calculating a moving distance of the mobile robot 1 will be described below.

First Embodiment

According to a first embodiment, the controller 200 may calculate a final moving distance L1 of the mobile robot 1 by correcting a moving distance L' based on a stored average slip rate SR1. That is, the controller 200 may calculate an average slip amount of the mobile robot 1 based on the average slip rate SRL and by correcting the moving distance L' of the mobile robot 1, which is obtained without considering the slip rate, the controller 200 may calculate the corrected moving distance L'.

During the rotation of the rotary plate 412, friction with a floor surface is continuously generated, such that slip occurs continuously. In this case, a slip rate varies depending on a floor condition and a condition of a floor cloth attached to a lower part of the rotary plate 412. However, a slip rate for floor materials of ordinary home falls within a predetermined category.

A storage 300 may store data about the average slip rate SR1 for a general floor material, which is within a predetermined category. By receiving the data about the average slip rate SR1 and correcting the moving distance L' of the mobile robot 1 which is obtained without consideration of the slip rate, the controller 200 may calculate the corrected moving distance L1.

The first embodiment has an effect in that the controller 200 may calculate a final moving distance L1 more rapidly by using the pre-stored data, stored in the storage 300, without need for processing data separately.

Second Embodiment

According to a second embodiment, the controller 200 may calculate a moving distance L2 of the mobile robot 1 by correcting a moving distance L' of the mobile robot 1, which is obtained without consideration of a slip rate, by using objects located near the mobile robot 1.

An obstacle sensor may sense the position of an obstacle located near the mobile robot 1. The obstacle may include an object having a shape which may be detected by the obstacle sensor, including the wall, furniture, or electronic products. The obstacle sensor may measure a distance from the mobile robot 1 to an obstacle.

By continuously measuring distances between the mobile robot 1 and an obstacle during a specific period of time, the obstacle sensor may measure a relative velocity v2 of the mobile robot 1. The obstacle sensor may transmit the relative velocity v2 to the controller 200.

Based on the relative velocity v2, which is received from the obstacle sensor, and data obtained from the encoder, the controller 200 may calculate an instantaneous slip rate SR2. The instantaneous slip rate R2 is a slip rate under conditions of a current floor condition, a current state of a floor cloth, and a current state of the mobile robot 1.

The controller 200 may correct the final moving distance L2 based on the instantaneous slip rate SR2, which is calculated from the moving distance L' of the mobile robot 1 without consideration of the slip rate.

The controller 200 may repeatedly calculate the instantaneous slip rates SR2 at predetermined time intervals, or may calculate the final moving distance L2 more accurately by updating a value of the instantaneous slip rate SR2.

The second embodiment has an effect in that by obtaining and using data about the position of an object near the mobile robot 1, an accurate moving distance of the mobile robot 1 may be calculated regardless of a state of the floor surface.

Third Embodiment

According to a third embodiment, by measuring a position variation x3 of the mobile robot 1 by obtaining lower image data, and by correcting the moving distance L' based on the position variation, the controller 200 may calculate a corrected moving distance L3 of the mobile robot 1.

The lower image sensor 130 is disposed on a bottom surface of the body 30, to obtain lower image data. The lower image sensor 130 may obtain image data of the bottom. The lower image sensor 130 includes a mouse imager, a laser light source, or an infrared light source. The lower image sensor 130 may measure a position variation x3 on an X-Y plane of the mobile robot 1. The lower image sensor 130 may transmit the obtained data x3 to the controller 200.

In the lower image sensor 130, an error may occur due to cut-off of a signal. The cut-off may include all hindrances, which hinder the lower image sensor 130 from accurately sensing images, including a case of an uneven surface of a floor made of a reflecting material.

If no signal cut-off occurs, the controller 200 may directly calculate the moving distance L3 based on a position variation x3' of the mobile robot 1 during the entire period of time.

If a signal is partially cut off, the controller 200 may calculate an instantaneous velocity v3 based on the position variation x3 of the mobile robot 1 during a partial period of time. The controller 200 may calculate an instantaneous slip rate SR3 from the instantaneous velocity v3. The controller 200 may calculate a final moving distance L3 by correcting the moving distance L' of the mobile robot 1, which is obtained without consideration of a slip rate, based on the instantaneous slip rate SR3 calculated from the moving distance L' of the mobile robot 1 without consideration of a slip rate.

The third embodiment has an effect in that by using the lower image sensor 130, which may measure a position variation two-dimensionally on the X-Y plane, the moving distance L3 may be calculated accurately on the X-Y plane.

The lower image sensor 130 may capture lower images repeatedly at predetermined time intervals, or may calculate the instantaneous slip rate SR3, and the controller 200 may calculate the final moving distance L3 by correcting the moving distance L' more accurately by repeatedly updating the instantaneous slip rate SR3.

Figure 3:
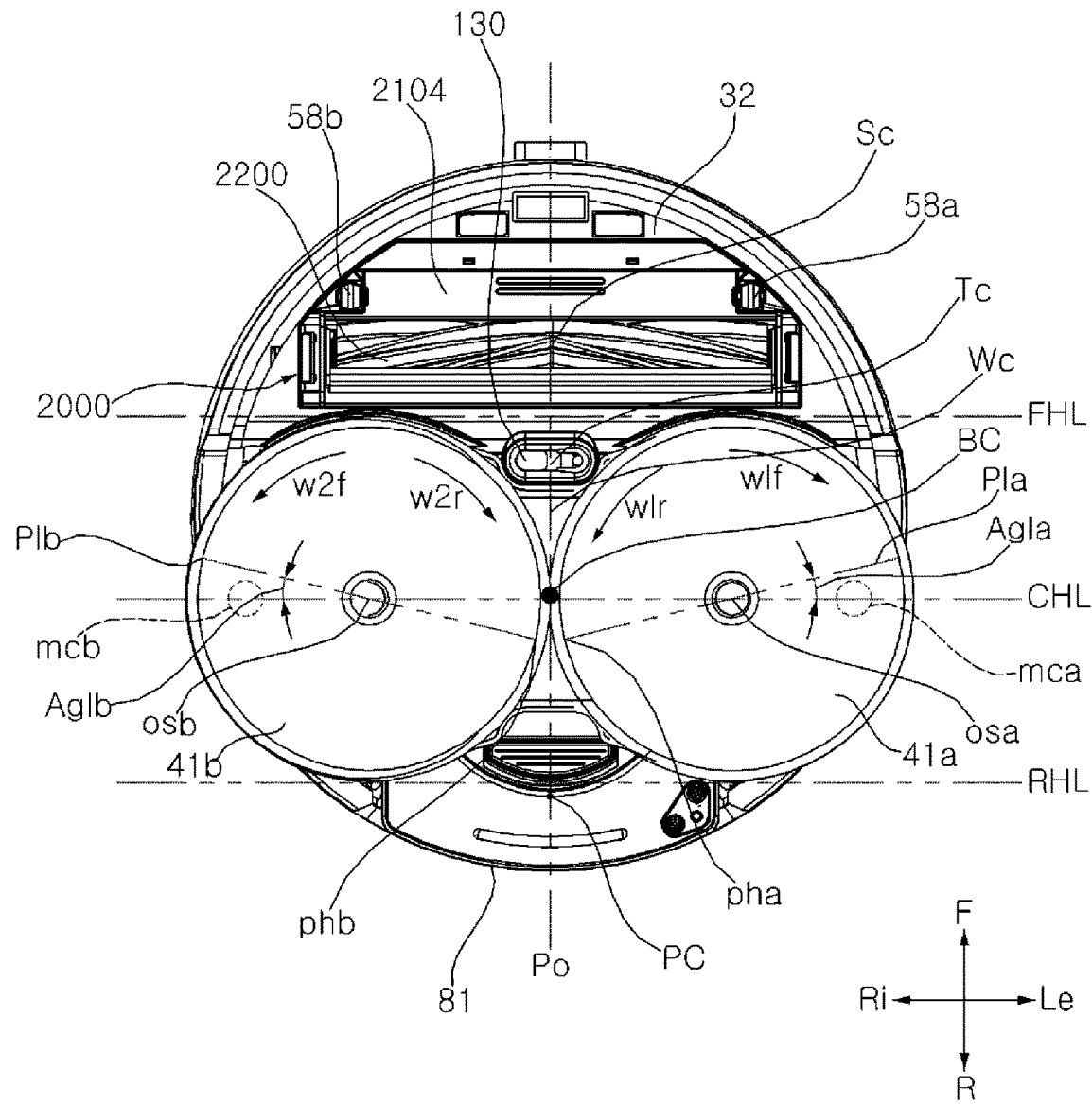
FIG. 3 is a bottom view of a mobile robot according to an embodiment of the present disclosure.
Figure 4:
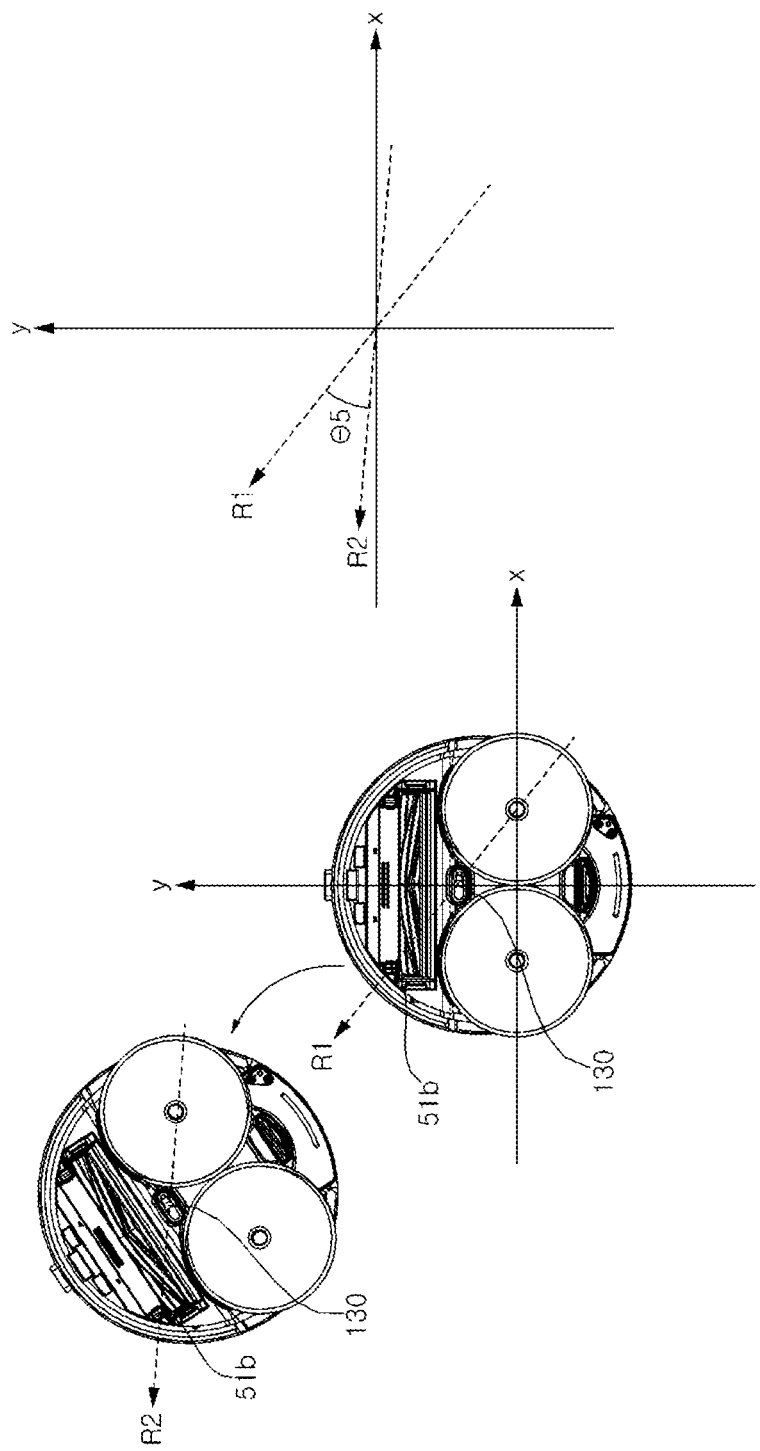
FIG. 4 is a diagram schematically illustrating a method of calculating a rotation angle of a mobile robot according to an embodiment of the present disclosure.
Figure 5:
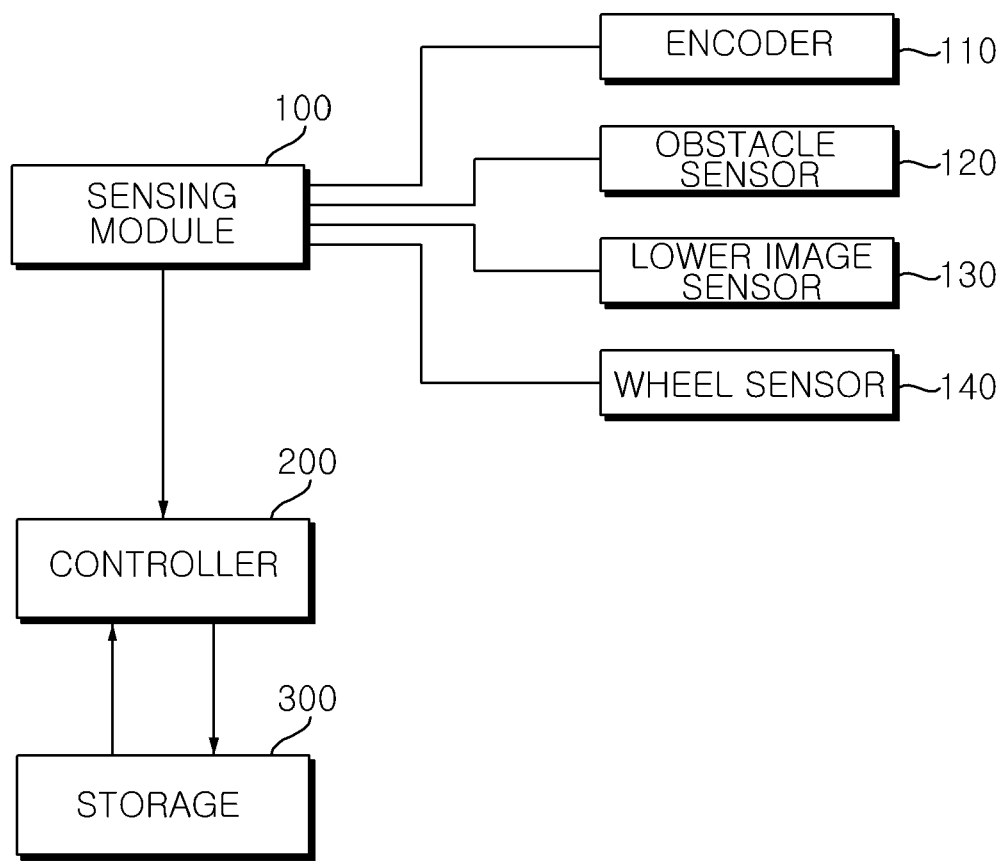
FIG. 5 is a block diagram schematically illustrating a configuration of a mobile robot according to an embodiment of the present disclosure.

Referring to FIG. 3, according to an embodiment of the present disclosure, the lower image sensor 130 may be disposed behind the sweep module 2000. The lower image sensor 130 may capture images of the floor after the sweep module 2000 cleans foreign matter from the floor, such that the lower image sensor 130 may measure a position variation accurately, and the moving distance L3 may be calculated accurately.

In another embodiment of the present disclosure, the lower image sensor 130 may be disposed behind the mop module 40. The lower image sensor 130 may be disposed behind the spin mop 41 or the floor cloth part 411. After the spin mop 41 or the floor cloth disposed at a lower portion of the floor cloth part 411 cleans foreign matter by mopping the floor, the lower image sensor 130 may capture images of the floor, such that the lower image sensor 130 may measure a position variation accurately, and the moving distance L3 may be calculated accurately.

Fourth Embodiment

According to a fourth embodiment, the controller 200 may calculate a final moving distance L4 of the mobile robot 1 by correcting the moving distance L' based on a number N4 of rotations of a caster wheel.

The caster 58, which supports the body 30, may further include a wheel sensor 140 for detecting the number of rotations of the caster wheel. The wheel sensor 140 may detect the number N4 of rotations of the caster wheel.

If a condition that the caster wheel 51 is maintained in contact with the floor without slipping is satisfied, the moving distance L4 of the mobile robot 1 may be directly calculated by (diameter of the caster wheel)×($\pi$)×(number N4' of rotations of the caster wheel).

By contrast, if the condition is not satisfied (the caster wheel partially slips), the number N4 of rotations of the caster wheel is measured for a predetermined period of time, and a moving distance of the mobile robot 1 during the predetermined period of time may be calculated. An instantaneous slip rate SR4 may be calculated based on the moving distance x4 during the predetermined period of time. Accordingly, the controller 200 may calculate the moving distance L4, which is corrected based on the instantaneous slip rate SR4 calculated from the moving distance L' of the mobile robot 1 without consideration of a slip rate.

The controller 200 may calculate the instantaneous slip rate SR4 repeatedly at predetermined time intervals, and may calculate the final moving distance L4 by updating a value of the instantaneous slip rate SR4.

The fourth embodiment has an effect in that the final moving distance L4 of the mobile robot 1 may be measured in a relatively simple and accurate manner by using only the number N4 of rotations of the caster wheel.

Fifth Embodiment

According to a fifth embodiment, the mobile robot 1 may measure or correct a rotation angle $\theta$ of the mobile robot 1 based on data obtained by two or more sensing modules 100 which are spaced apart from each other.

The controller 200 may calculate a rotation angle $\theta$ of the mobile robot 1 without consideration of a slip rate based on data about the angular speed, direction of rotation, number of rotations, or inclination of the rotary plate 412 which are obtained by the encoder. The controller 200 may calculate a final rotation angle of $\theta$ of the mobile robot 1 by correcting the rotation angle $\theta'$ of the mobile robot 1, which is obtained without consideration of a slip rate, based on the data obtained by two or more sensing modules 100.

The first sensor and the second sensor are spaced apart from each other, in which in the case of only a translational movement, the first sensor and the second sensor obtain the same data, while in the case of both rotational and translational movements, the first sensor and the second sensor obtain different data. The controller 200 may measure or correct the rotation angle $\theta'$ of the mobile robot 1 based on a difference in the data between the first sensor and the second sensor.

Before movement, the controller 200 may specify a first central line R1 which passes through the center of the two or more sensing modules 100 which are spaced apart from each other, and after movement, the controller 200 may specify a second central line R2 which passes through the center of the two or more sensing modules 100 which are spaced apart from each other. The controller 200 may calculate a rotation angle $\theta 5$ of the mobile robot 1 by measuring an angle formed between the first central line R1 and the second central line R2.

The mobile robot 1 may rotate according to a difference in the number of rotations of the spin mops 41. However, since slip occurs continuously, it is difficult to measure a rotation angle accurately. The fifth embodiment has an effect in that the final rotation angle $\theta 5$ of the mobile robot 1 may be measured accurately by using two or more sensing modules 100 which are spaced apart from each other.

An error may be further reduced if a distance between the sensing modules 100 increases.

The sensing module 100 for measuring the rotation angle may include at least one or more lower image sensors 130. The sensing module 100 for measuring the rotation angle may include the wheel sensor 140 for sensing the number of rotations of at least one or more caster wheels. The sensing module 100 for measuring the rotation angle may include both the lower image sensor 130 and the wheel sensor 140 at the same time. Furthermore, in addition to the lower image sensor 130 or the wheel sensor 140, the aforementioned sensing module 100 may be included.

The mobile robot 1 may include each or all of the obstacle sensor, the lower image sensor 130, and the wheel sensor 140 of the caster. Accordingly, the controller 200 may combine the correction data calculated in the first to fifth embodiments, and may calculate the moving distance of the mobile robot 1 more accurately. Each of the first embodiment to the fifth embodiment may include its own problem of errors, such that by combining at least two or more data in the first to fifth embodiments, the moving distance may be corrected more accurately.

Based on the foregoing, a control method of measuring the moving distance L or the rotation angle $\theta$ of the mobile robot 1 will be described below.

The controller 200 may obtain one or more data of an inclination, a rotation direction, a rotation speed, and a number of rotations of the rotary plate 412 from the encoder connected to the spin mop 41 in S100, and may calculate the moving distance L' or the rotation angle θ' without consideration of a slip rate in S200.

The controller 200 may obtain at least one or more data of a moving distance, a moving speed, and a position variation during a predetermined period of time from the sensing module 100 disposed at the body 30 in S300.

The controller 200 may calculate the moving distance of the mobile robot 1 by correcting the moving distance or the rotation angle, which is obtained without consideration of the slip rate, by using the data obtained from the sensing module 100 in S400.

According to the first embodiment, the control method may further include: transmitting the average slip rate SRL stored in the storage 300, to the controller 200 in S411; and calculating the final moving distance L1 by correcting the moving distance L' of the mobile robot 1, which is obtained without consideration of the slip rate, based on the average slip rate SR1 in S412.

According to the second embodiment, the control method may further include sensing, by the obstacle sensor, the position of a nearby obstacle, and measuring a distance between the sensed obstacle and the mobile robot 1 in S320. The control method may further include repeatedly measuring distances between the obstacle and the mobile robot 1 at predetermined time intervals. In addition, the control method may further include calculating the relative velocity v2 of the mobile robot 1 based on the measured distances and time periods in S421. Furthermore, the control method may further include calculating the instantaneous slip rate SR2 of the mobile robot 1 based on the calculated relative velocity v2 of the mobile robot 1 in S422. Moreover, the control method may further include correcting the moving distance L', calculated in S200, based on the calculated relative velocity v2 of the mobile robot 1 in S423, so as to calculate the final moving distance L2 of the mobile robot 1.

According to the third embodiment, the sensing module 100 is disposed at a bottom surface of the body 30, and may include the lower image sensor 130 for acquiring lower image data. The lower image data 130 may capture images of the floor. The lower image sensor 130 may capture images of the floor for a predetermined period of time to measure a position variation x3 in X-Y coordinates in S330.

If cut-off of a signal in the lower image sensor 130 does not occur in S331, the control method may further include: by the controller 200, measuring a position variation x3 of the mobile robot 1 during the entire period of time in S332'; and correcting the moving distance, calculated in (B), in S341'.

If cut-off of a signal in the lower image sensor 130 occurs in S331, the control method may further include: measuring a position variation x3 of the mobile robot 1 during a predetermined period of time in S332; calculating the instantaneous velocity v3 of the mobile robot 1 based on the measured position variation in S341; calculating the instantaneous slip rate SR3 based on the calculated instantaneous velocity in S342; and correcting the moving distance by using the calculated instantaneous slip rate SR3 in S343, such that the controller 200 may correct and calculate the final moving distance L3.

According to the fourth embodiment, the sensing module 100 may further include the wheel sensor 140 for sensing the number of rotations of the caster wheel. The wheel sensor 140 may measure the number N4 of rotations of the caster wheel 51.

If slip of the caster wheel 51 does not occur in S340, the control method may include: calculating the number N4' of rotations of the caster wheel 51 during the entire period of time in S342'; and calculating a moving distance x4' of the mobile robot 1 during a predetermined period of time based on the number N4' of rotations of the caster wheel 51 in S441'. By calculating the moving distance L4 of the mobile robot 1 using (diameter of the caster wheel)×(π)×(number N4' of rotations of the caster wheel), the controller 200 may calculate the final moving distance L4.

If slip partially occurs in the caster wheel 51 in S341, the control method may include: measuring, by the wheel sensor 140, the number N4 of rotations of the caster wheel 51 during a predetermined period of time in S342; and calculating the moving distance x4 of the mobile robot 1 during a predetermined period of time based on the number N4 of the caster wheel 51 in S441. The control method may further include: calculating the instantaneous slip rate SR4 during a predetermined period of time based on the calculated moving distance x4 in S442; and correcting the moving distance L', calculated in S200, based on the calculated instantaneous slip rate SR4 in S443, so as to calculate the final moving distance L4 of the mobile robot 1.

According to the fifth embodiment, in order to measure or correct a rotation angle of the mobile robot 1, the mobile robot 1 may obtain data in S350 by operating two or more sensing modules 100 which are spaced apart from each other. The control method may include: before movement at t1, specifying the first central line R1 which passes through the first sensor and the second sensor in S451; and after movement at t2, specifying the second central line R2 which passes through the first sensor and the second sensor in S452. The control method may further include, upon moving the first central line R1 and the second central line R2 so that they intersect at one point, measuring the rotation angle θ of the mobile robot 1 in S453, which is formed by the first central line R1 and the second central line R2. The rotation angle θ may be calculated by correcting the rotation angle θ' of the mobile robot 1, or may be calculated directly.

Figure 12:
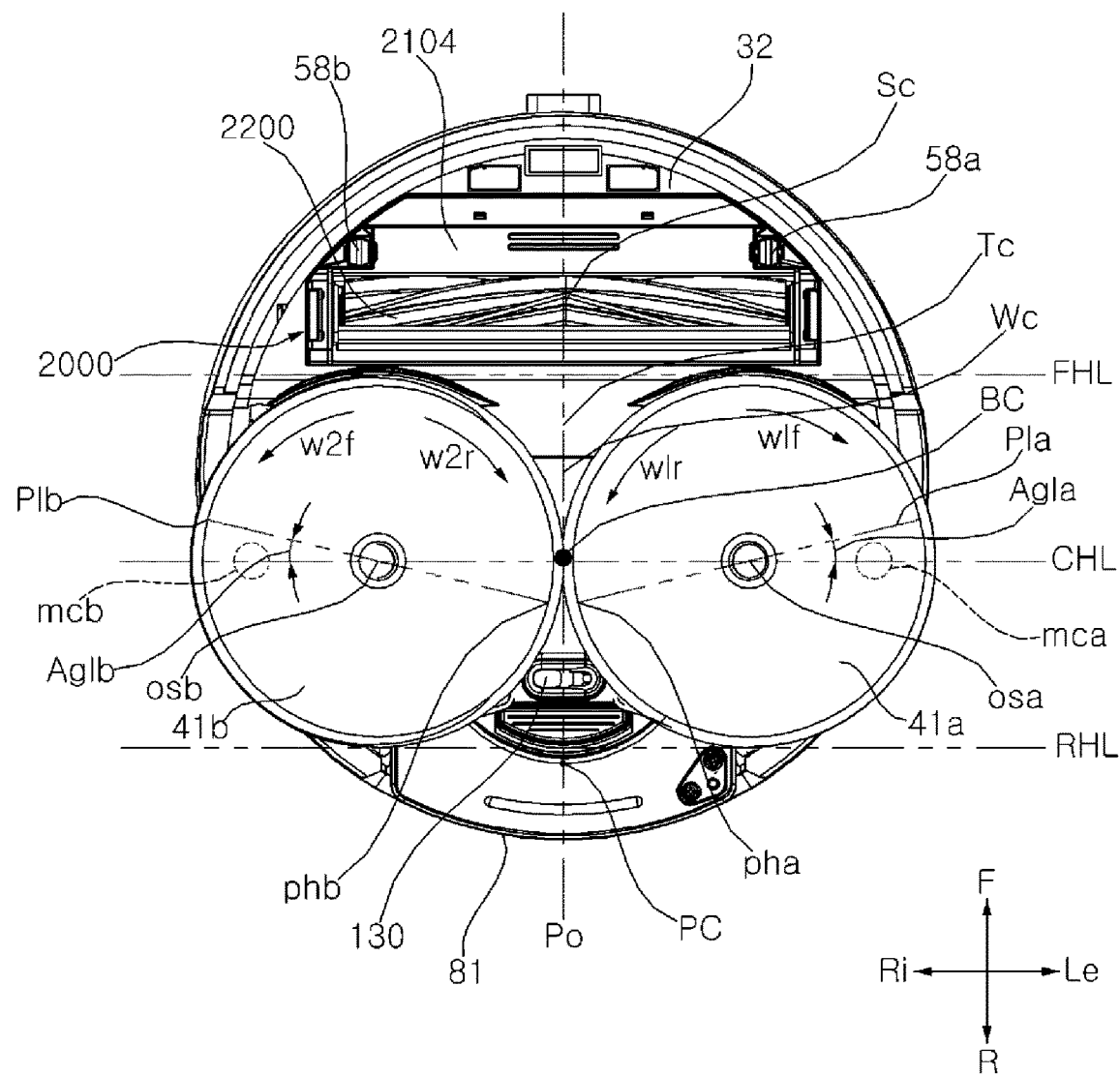
FIG. 12 is a bottom view of a mobile robot according to another embodiment of the present disclosure.

Referring to FIG. 12, the embodiment illustrated in FIG. 12 will be described below based on differences from the embodiment of FIG. 3. Elements not specifically described in FIG. 12 are considered to be the same as FIG. 3.

In the embodiment of FIG. 12, a position of the lower image sensor 130 is different from the embodiment of FIG. 3.

The lower image sensor 130 may be biased toward the rear horizontal line RHL between the front horizontal line FHL and the rear horizontal line RHL. Specifically, the lower image sensor 130 may be biased toward the rear horizontal line RHL between the central horizontal line CHL and the rear horizontal line RHL. Further, the lower image sensor 130 may be disposed at a position, at which the water tank 81 and the spin mop 41 do not overlap with each other.

Accordingly, the lower image sensor 130 scans the floor after the sweep module 2000 removes foreign matter from the floor in front of the mobile robot 1 and the spin mop 41 completely removes liquid foreign matter from the floor, such that the lower image sensor 130 may acquire accurate images and may sense images accurately.

In addition, the lower image sensor 130 is positioned eccentrically from the geometric center Tc of the body 30, such that the lower image sensor 130 may easily sense the mobile robot rotating in place.

Figure 13:
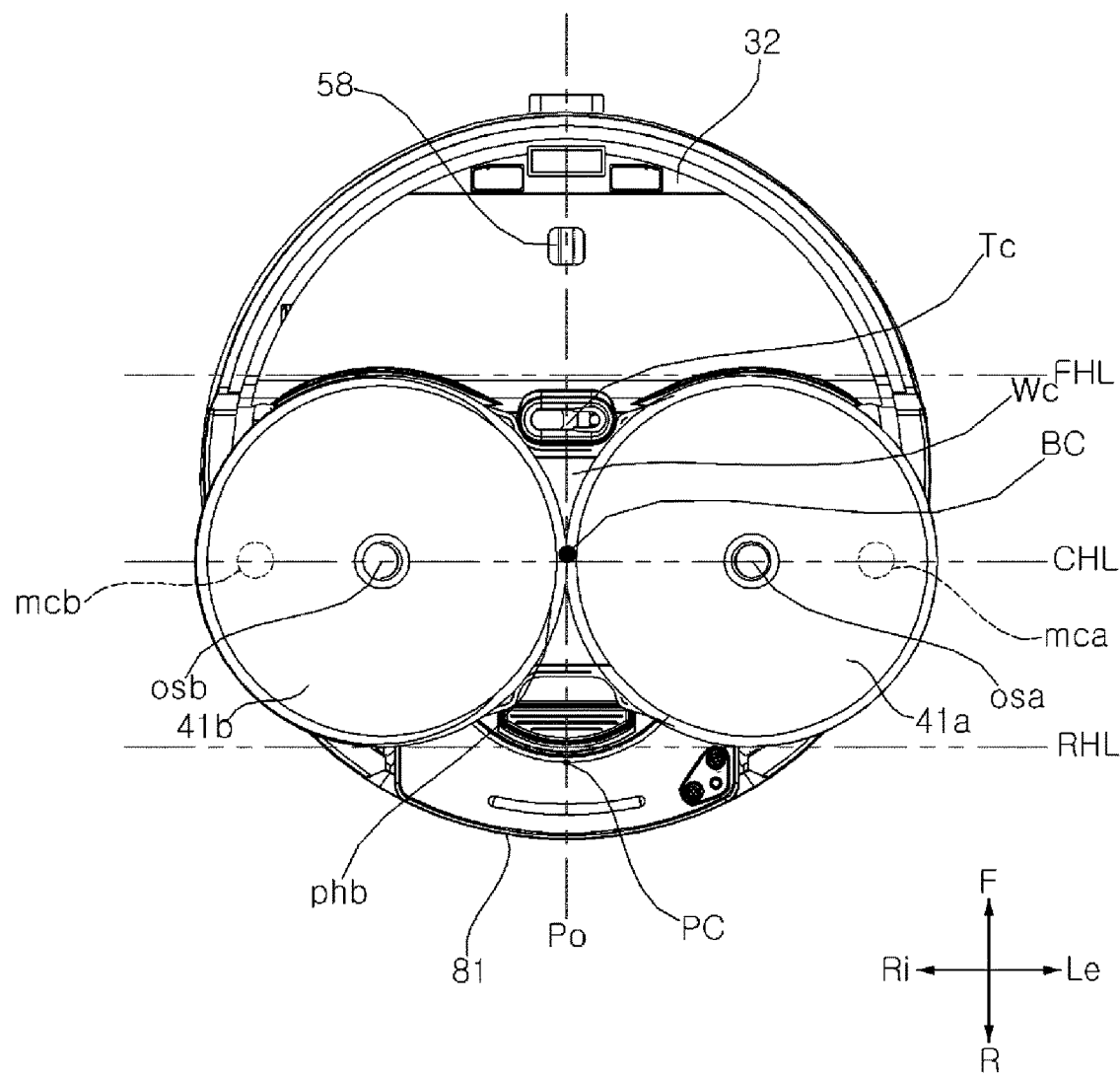
FIG. 13 is a bottom view of a mobile robot according to yet another embodiment of the present disclosure.

Referring to FIG. 13, the embodiment illustrated in FIG. 13 will be described below based on differences from the embodiment of FIG. 3. Elements not specifically described in FIG. 13 are considered to be the same as FIG. 3.

In the embodiment of FIG. 13, the sweep module 20 of FIG. 3 is omitted. A single caster 58 is installed in the body

30. On the central vertical line Po, the caster 58 is disposed forward of the center of mass BC of the battery Bt, the center of mass WC of the mobile robot 1, the right spin shaft Osb, the left spin shaft Osa, and the geometric center Tc of the body 30. The center of mass WC of the mobile robot 1 and the geometric center Tc of the body 30 are located in a virtual triangle, formed by sequentially connecting the caster 58, the right spin shaft Osb, and the left spin shaft Osa. The center of mass MCa of the left mop motor, the center of mass MCb of the right mop motor, and the center of mass PC of the water tank may be located outside of the virtual triangle.

Further, the center of mass WC of the mobile robot 1, the geometric center Tc of the body 30, and the center of mass BC of the battery Bt may be located in the virtual triangle, formed by sequentially connecting the caster 58, the right spin shaft Osb, and the left spin shaft Osa.

Figure 14:
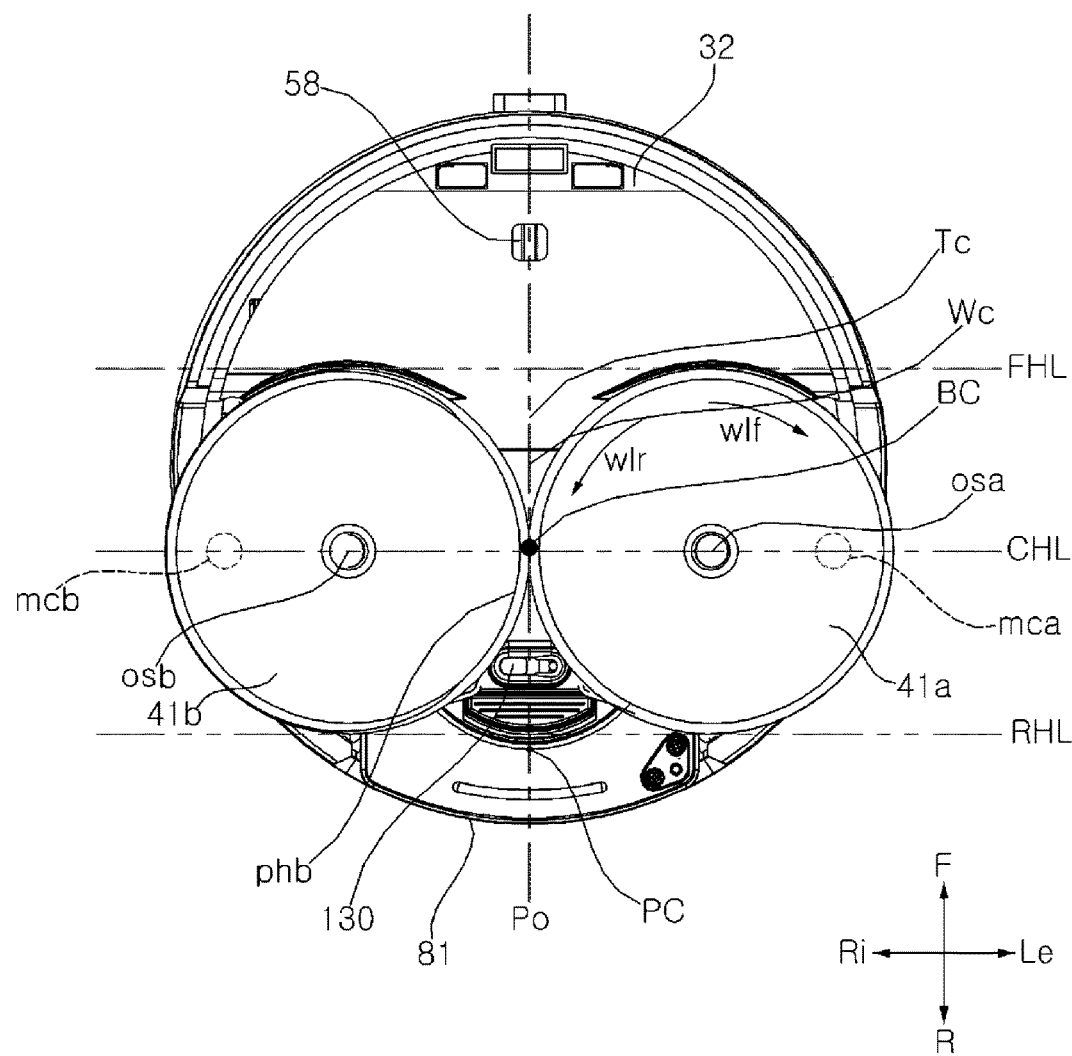
FIG. 14 is a bottom view of a mobile robot according to still embodiment of the present disclosure.

Referring to FIG. 14, the embodiment illustrated in FIG. 14 will be described below based on differences from the embodiment of FIG. 13. Elements not specifically described in FIG. 14 are considered to be the same as FIG. 13.

In the embodiment of FIG. 14, a position of the lower image sensor 130 is different from the embodiment of FIG. 13.

The lower image sensor 130 may be biased toward the rear horizontal line RHL between the front horizontal line FHL and the rear horizontal line RHL. Specifically, the lower image sensor 130 may be biased toward the rear horizontal line RHL between the central horizontal line CHL and the rear horizontal line RHL. Further, the lower image sensor 130 may be disposed at a position, at which the water tank 81 and the spin mop 41 do not overlap with each other.

The lower image sensor 130 is located outside of a virtual triangle, formed by sequentially connecting the caster 58, the right spin shaft Osb, and the left spin shaft Osa.

Accordingly, the lower image sensor 130 scans the floor after the sweep module 2000 removes foreign matter from the floor in front of the mobile robot 1, and the spin mop 41 completely removes liquid foreign matter from the floor, such that the lower image sensor 130 may acquire accurate images and may sense images accurately.

In addition, the lower image sensor 130 is positioned eccentrically from the geometric center Tc of the body 30, such that the lower image sensor 130 may easily sense the mobile robot rotating in place.

Accordingly, the mobile robot 1 may travel accurately while traveling in a pattern for thorough cleaning.

According to the present disclosure, a mobile robot and a method of calculating a moving distance of the mobile robot has one or more of the following effects.

Firstly, by storing an average slip rate in a storage, and by correcting a moving distance based on the stored average slip rate, a final moving distance may be calculated accurately for a floor surface formed of a general material.

Secondly, by detecting a position of a nearby obstacle using an obstacle sensor, calculating a relative velocity and an instantaneous slip rate based on the detected position, and correcting a moving distance based on the instantaneous slip rate, a final moving distance may be calculated more accurately.

Thirdly, by measuring a position variation on an X-Y plane of the mobile robot, and correcting a moving distance based on the measured position variation, a final moving distance may be calculated more accurately.

Fourthly, by providing a caster for supporting the mobile robot, a caster wheel provided for the caster, and a wheel sensor for measuring a number of rotations of the caster wheel, and by calculating a moving distance based on the number of rotations of the caster wheel, a final moving distance may be calculated more accurately.

Fifthly, based on a difference in data obtained by spaced-apart two or more sensing modules, a final moving distance may be calculated more accurately.

Sixthly, in the present disclosure, a lower image sensor is disposed on a central vertical line of a body, and is disposed forward of a virtual central horizontal line, formed by connecting a spin shaft of a left spin mop and a spin shaft of the right spin mop, such that a possibility of malfunction in the lower image sensor may be reduced, which may occur when the floor is wiped with water by mopping of the spin mops. Further, as the position of the sensor deviates from the center of rotation (at a position parallel to the central horizontal line) of the mobile robot, a rotating motion of the mobile robot may be detected.

Seventhly, in the present disclosure, a lower image sensor is disposed on a central vertical line of a body, and is disposed forward of a virtual central horizontal line, formed by connecting a spin shaft of a left spin mop and a spin shaft of the right spin, such that the lower image sensor may first detect a carpet and may prevent the wheel-less spin mop from climbing the carpet.

Eighthly, in the present disclosure, a lower image sensor is disposed on a central vertical line of a body, and is disposed between a virtual central horizontal line, formed by connecting a spin shaft of a left spin mop and a spin shaft of the right spin, and a rear horizontal line, such that foreign matter on the floor may be removed by the mopping of the spin mops, thereby reducing a sensing error occurring due to the foreign matter. Further, as the position of the sensor deviates from the center of rotation (at a position parallel to the central horizontal line) of the mobile robot, a rotating motion of the mobile robot may be detected.

Ninthly, in the present disclosure, a body has a circular shape, and a dry-type module does not protrude outside of the body, such that the mobile robot may rotate freely at any position in an area to be cleaned. Further, a wide width of an agitator may be maintained, allowing a wide range of cleaning, and collecting of a relatively large foreign material and mopping of the floor may be performed at the same time.

However, the effects of the present disclosure are not limited to the aforesaid, and other effects not described herein will be clearly understood by those skilled in the art from the following description of the appended claims.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the disclosure as defined by the appended claims, and the modified implementations should not be construed independently of the technical idea or prospect of the present disclosure.

What is claimed is:

1. A mobile robot, comprising:
 a body configured to move on a surface in a travel direction;
 a left spin mop rotatably coupled to the body, the left spin mop having a spin shaft;
 a right spin mop rotatably coupled to the body, the right spin mop having a spin shaft;
 a left mop motor positioned in the body and configured to rotate the left spin mop;
 a right mop motor positioned in the body and configured to rotate the right spin mop;

a sensing module including a lower image sensor, the sensing module being disposed on a surface of the body, the sensing module being configured to obtain data corresponding to at least one of (i) a moving distance or (ii) a moving speed of the body for a predetermined period of time when the body moves; and a sweep module configured to collect foreign matter from the surface and coupled to the body, wherein the sweep module comprises an agitator, a left caster and a right caster, wherein the left and right casters are configured to contact the surface, wherein the lower image sensor is disposed behind the left and right casters, wherein the lower image sensor is disposed forward of a virtual central horizontal line, the virtual central horizontal line being a virtual line that connects the spin shaft of the left spin mop and the spin shaft of the right spin mop, wherein the sweep module is spaced apart from, and positioned in front of, the left and right spin mops, wherein a center of the sweep module is disposed on a virtual central vertical line which vertically intersects the virtual central horizontal line at a center of the virtual central horizontal line, wherein a center of mass of the left mop motor and a center of mass of the right mop motor vertically overlap with the virtual central horizontal line, wherein the left mop motor is disposed on the left spin mop, wherein the right mop motor is disposed on the right spin mop, wherein the left mop motor is biased leftward from the spin shaft of the left spin mop, wherein the right mop motor is biased rightward from the spin shaft of the right spin mop, wherein the center of mass of the left mop motor is disposed between the spin shaft of the left spin mop and a left end of the left spin mop, and the center of mass of the right mop motor is disposed between the spin shaft of the right spin mop and a right end of the right spin mop, wherein the agitator is parallel to the virtual central horizontal line, wherein the left caster and the right caster are positioned in front of the agitator, wherein the body further includes a water tank configured to store water, wherein the water tank is disposed behind the sensing module, wherein the sweep module is disposed in front of the lower image sensor, wherein the agitator is disposed between the left and right casters and the left and right spin mops, wherein the lower image sensor is disposed between the agitator and the virtual central horizontal line on a bottom surface of the body on the virtual central vertical line, wherein the sweep module is disposed entirely in between the center of mass of the left mop motor and the center of mass of the right mop motor, and wherein a distance between end portions of the agitator is larger than a distance between the left and right casters.

2. The mobile robot of claim 1, wherein the lower image sensor is disposed behind a virtual front horizontal line that connects a front end of the left spin mop and a front end of the right spin mop.

3. The mobile robot of claim 1, wherein a center of the water tank is disposed behind a virtual rear horizontal line that connects a rear end of the left spin mop and a rear end of the right spin mop.

4. The mobile robot of claim 1, wherein a central portion of the agitator is disposed on the virtual central vertical line.

5. The mobile robot of claim 1, wherein a length of the agitator extends in a horizontal direction from the virtual central vertical line to a distance between the center of mass of the left mop motor and the spin shaft of the left spin mop and extends in the horizontal direction from the virtual central vertical line to a distance between the center of mass of the right mop motor and the spin shaft of the right spin mop.

6. The mobile robot of claim 1, wherein the sensing module further includes an obstacle sensor configured to detect an obstacle, the obstacle sensor being located on a boundary of a front and upper side of the mobile robot.

7. The mobile robot of claim 1, wherein a portion of the left spin mop and the right spin mop are exposed to an outside of the body, and wherein the exposed portion of each of the left spin mop and the right spin mop is less than a half of a radius of each spin mop.

8. The mobile robot of claim 1, wherein an applied pressure of the left spin mop is highest at a front outer side of the left spin mop, and an applied pressure of the right spin mop is highest at a front outer side of the right spin mop.

9. The mobile robot of claim 1, wherein a lower surface of each of the left spin mop and the right spin mop is tilted, and wherein a tilt angle of the left spin mop and a tilt angle of the right spin mop form an acute angle.

10. The mobile robot of claim 1, wherein the sensing module further includes an encoder configured to measure a rotation speed or a number of rotations of the left mop and the right mop.

11. A mobile robot, comprising:

a body configured to move on a surface in a travel direction;

a left spin mop and a right spin mop, wherein the left and right spin mops support the body and are rotatably coupled to the body;

a left mop motor configured to rotate the left spin mop and a right mop motor configured to rotate the right spin mop;

a sensing module including a lower image sensor, the sensing module being disposed on a surface of the body, wherein the sensing module is configured to obtain data corresponding to at least one of (i) a moving distance or (ii) a moving speed of the body for a predetermined period of time when the body moves; and a sweep module configured to collect foreign matter from the surface and coupled to the body, wherein the sweep module comprises an agitator, a left caster and a right caster, wherein the left and right casters are configured to contact the surface, wherein the lower image sensor is disposed behind the left and right casters, wherein the lower image sensor is disposed between a virtual front horizontal line and a virtual rear horizontal line, the virtual front horizontal line being a virtual line that connects a front end of the left spin mop and a front end of the right spin mop, and the virtual rear horizontal line being a virtual line that connects a rear end of the left spin mop and a rear end of the right spin mop, wherein the sweep module is spaced apart from, and positioned in front of, the left and right spin mops, wherein a center of the sweep module is disposed on a virtual central vertical line which vertically intersects a virtual central horizontal line at a center of the virtual central horizontal line, wherein the virtual central horizontal line is a virtual line that connects a spin shaft of the left spin mop and a spin shaft of the right spin mop, wherein a center of mass of the left mop motor and a center of mass of the right mop motor vertically overlap with the virtual central horizontal line, wherein the left mop motor is disposed on the left spin mop, wherein the right mop motor is disposed on the right spin mop, wherein the left mop motor is biased leftward from the spin shaft of the left spin mop, wherein the right mop motor is biased rightward from the spin shaft of the right spin mop, wherein the center of mass of the left mop motor is disposed between the spin shaft of the left spin mop and a left end of the left spin mop, and the center of mass of the right mop motor is disposed between the spin shaft of the right spin mop and a right end of the right spin mop, wherein the agitator is parallel to the virtual central horizontal line, wherein the left caster and the right caster are positioned in front of the agitator, wherein the body further includes a water tank configured to store water, wherein the water tank is disposed behind the sensing module, wherein the sweep module is disposed in front of the lower image sensor, wherein the agitator is disposed between the left and right casters and the left and right spin mops, wherein the lower image sensor is disposed between the agitator and the virtual central horizontal line on a bottom surface of the body on the virtual central vertical line, wherein the sweep module is disposed entirely in between the center of mass of the left mop motor and the center of mass of the right mop motor, and wherein a distance between end portions of the agitator is larger than a distance between the left and right casters.

12. The mobile robot of claim 11, wherein the lower image sensor is positioned closer to the virtual front horizontal line than the virtual rear horizontal line.

13. The mobile robot of claim 11, wherein a center of the water tank is disposed behind the virtual rear horizontal line.

14. The mobile robot of claim 13, wherein the sensing module further includes a gyro sensor configured to detect a rotation direction and a rotation angle of the body when the body moves.

15. The mobile robot of claim 11, wherein a central portion of the agitator is disposed on the virtual central vertical line.

16. The mobile robot of claim 11, wherein a length of the agitator extends in a horizontal direction from the virtual central vertical line to a distance between the center of mass of the left mop motor and the spin shaft of the left spin mop and extends in the horizontal direction from the virtual central vertical line to a distance between the center of mass of the right mop motor and the spin shaft of the right spin mop.

* * * * *